United States Patent
Ogushi

(10) Patent No.: US 10,531,025 B2
(45) Date of Patent: Jan. 7, 2020

(54) IMAGING ELEMENT, IMAGING APPARATUS, AND METHOD FOR PROCESSING IMAGING SIGNALS

(71) Applicant: CANON KABUSHIKI KAISHA, Tokyo (JP)

(72) Inventor: Naoto Ogushi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 34 days.

(21) Appl. No.: 15/598,768

(22) Filed: May 18, 2017

(65) Prior Publication Data

US 2017/0353678 A1    Dec. 7, 2017

(30) Foreign Application Priority Data

Jun. 1, 2016 (JP) .................... 2016-110500

(51) Int. Cl.
*H04N 5/355* (2011.01)
*H04N 5/232* (2006.01)
(Continued)

(52) U.S. Cl.
CPC ....... *H04N 5/35581* (2013.01); *H04N 5/2353* (2013.01); *H04N 5/23212* (2013.01);
(Continued)

(58) Field of Classification Search
CPC ............ H04N 5/35581; H04N 5/378; H04N 5/23212; H04N 5/23267; H04N 5/2353;
(Continued)

(56) References Cited

U.S. PATENT DOCUMENTS 7,961,983 B2 *   6/2011   Uyttendaele .......... G06T 3/4038
                                                                    382/154
8,988,595 B2 *   3/2015   Kunieda ............ H04N 5/23212
                                                                    348/352

(Continued)

FOREIGN PATENT DOCUMENTS

JP   2003-179819 A   6/2003
JP   2013-072906 A   4/2013
JP   2015-144416 A   8/2015

*Primary Examiner* — Pritham D Prabhakher
(74) *Attorney, Agent, or Firm* — Cowan, Liebowitz & Latman, P.C.

(57) ABSTRACT

An imaging element includes a plurality of photoelectric conversion units that respectively receives lights passing through different partial pupil regions with respect to lights from a shooting lens. Each of the pixel units has first and second photoelectric conversion units, and a video image signal processing unit and a phase difference signal processing unit obtain and process each of signals output from the first and second photoelectric conversion units. A video image signal processing unit obtains the signals of the first and second photoelectric conversion units having the setting of different output conditions of pixel signals, and performs a dynamic range expanding process of the image signal. The phase difference signal processing unit corrects the signals of the first and second photoelectric conversion units and performs focus detection of the phase difference detection method. The video image signal processing unit and the phase difference signal processing unit execute the respective signal processes in parallel in a single shooting operation.

15 Claims, 14 Drawing Sheets

(51) Int. Cl.
  *H04N 5/235* (2006.01)
  *H04N 5/378* (2011.01)
  *H04N 5/369* (2011.01)

(52) U.S. Cl.
  CPC ..... *H04N 5/23267* (2013.01); *H04N 5/35554* (2013.01); *H04N 5/3696* (2013.01); *H04N 5/378* (2013.01)

(58) Field of Classification Search
  CPC ............. H04N 5/35554; H04N 5/3696; H04N 5/2355; H04N 5/238; H04N 5/23258; H04N 5/23287; H04N 5/3572; G02B 7/34; H01L 27/14601
  USPC ....................................................... 348/308
  See application file for complete search history.

(56) References Cited

U.S. PATENT DOCUMENTS

| | | | | |
|---|---|---|---|---|
| 9,392,160 B2* | 7/2016 | Sfaradi | ............. | H04N 5/23212 |
| 9,411,211 B2* | 8/2016 | Ohara | ................... | G03B 13/36 |
| 9,531,960 B2 | 12/2016 | Kimura | | |
| 9,538,068 B2 | 1/2017 | Kishi | | |
| 9,667,878 B2* | 5/2017 | Ishii | ..................... | H04N 5/2352 |
| 9,888,189 B2* | 2/2018 | Kageyama | ............. | H04N 5/353 |
| 2009/0022421 A1* | 1/2009 | Uyttendaele | .......... | G06T 3/4038 |
| | | | | 382/284 |
| 2009/0289169 A1* | 11/2009 | Yang | .................. | H04N 5/23212 |
| | | | | 250/201.2 |
| 2013/0265484 A1* | 10/2013 | Hasegawa | .......... | H04N 5/23212 |
| | | | | 348/349 |
| 2014/0022354 A1* | 1/2014 | Okigawa | ................ | H04N 5/347 |
| | | | | 348/46 |
| 2014/0307117 A1* | 10/2014 | Feng | .................... | H04N 5/2355 |
| | | | | 348/218.1 |
| 2014/0347532 A1* | 11/2014 | Kang | .................... | H04N 5/351 |
| | | | | 348/294 |
| 2015/0181108 A1* | 6/2015 | Endo | ........................ | G02B 7/34 |
| | | | | 348/345 |
| 2015/0189249 A1* | 7/2015 | Hiyama | ................ | H04N 9/045 |
| | | | | 348/281 |
| 2015/0244925 A1* | 8/2015 | Kawai | ...................... | G02B 7/34 |
| | | | | 348/349 |
| 2015/0256736 A1* | 9/2015 | Fukuhara | ........... | H04N 5/23212 |
| | | | | 348/349 |
| 2015/0296129 A1* | 10/2015 | Ishikawa | ............... | H04N 5/3696 |
| | | | | 348/349 |
| 2015/0319356 A1* | 11/2015 | Ohara | .................... | G03B 13/36 |
| | | | | 348/349 |
| 2015/0373250 A1* | 12/2015 | Sfaradi | ............... | H04N 5/23212 |
| | | | | 348/345 |
| 2016/0021299 A1* | 1/2016 | Endo | .................. | H04N 5/23212 |
| | | | | 348/345 |
| 2016/0080634 A1* | 3/2016 | Hamano | ................... | G02B 7/365 |
| | | | | 348/349 |
| 2016/0094779 A1* | 3/2016 | Arakawa | ........... | H04N 5/23212 |
| | | | | 348/348 |
| 2016/0269605 A1* | 9/2016 | Ishii | ..................... | H04N 5/2352 |
| 2016/0286108 A1* | 9/2016 | Fettig | ................... | H04N 5/2355 |
| 2016/0295136 A1* | 10/2016 | Kageyama | ............. | H04N 5/353 |
| 2017/0041542 A1* | 2/2017 | Ono | .................... | H04N 5/23254 |

* cited by examiner

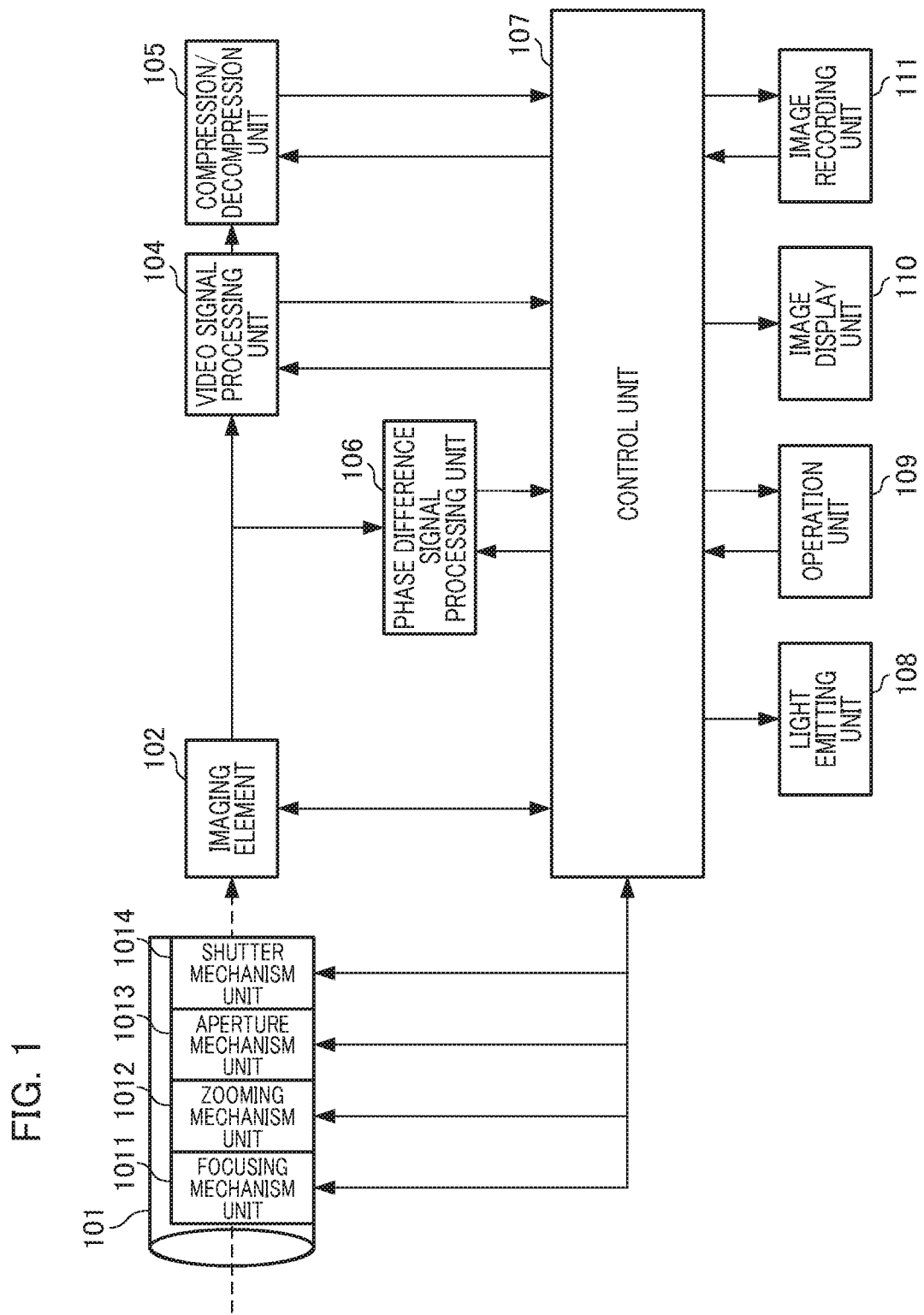

IMAGING ELEMENT, IMAGING APPARATUS, AND METHOD FOR PROCESSING IMAGING SIGNALS

BACKGROUND OF THE INVENTION

Field of the Invention

The present invention relates to an imaging element having a plurality of pixel units, an imaging apparatus using the imaging element, and a method for processing imaging signals.

Description of the Related Art

In an imaging apparatus, there is a process that generates a dynamic range image that is visually wider than a dynamic range image that can be obtained by a single shooting (hereinafter, referred to as an "HDR image".). A technique is disclosed which configures an imaging element and in which an HDR image is generated by regularly arranging pixels having different aperture ratios (Japanese Patent Application Laid-Open Publication No. 2003-179819). Additionally, in a configuration of an imaging apparatus that enables obtaining images of different viewpoints by a single shooting, a pair of object images formed by a luminous flux that has passed through different pupil regions can be obtained. A technique in which focus detection is performed by using a correlation calculation based on the pair of object images that have been obtained is disclosed (Japanese Patent Application Laid-Open Publication No. 2013-072906). Additionally, a technique is disclosed in which an HDR image is generated by using an imaging element having a pupil dividing pixel unit in which a plurality of pixels is allocated to one microlens (Japanese Patent Application Laid-Open Publication No. 2015-144416).

Although the apparatus disclosed in Japanese Patent Application Laid-Open Publication No. 2013-072906 performs focus detection by using the imaging element having the pupil dividing pixel unit in which the pixels are allocated to the one microlens, Japanese Patent Application Laid-Open Publication No. 2013-072906 does not disclose the process that generates an HDR image. Additionally, the apparatus disclosed in Japanese Patent Application Laid-Open Publication No. 2015-144416 generates an HDR image by combination of pixels each having different aperture ratios with respect to the microlens. In this method, if phase difference detection is performed by using pixels that largely obstruct light rays and signals that cause highlight-detail loss, accuracy in the phase difference detection may be lowered.

SUMMARY OF THE INVENTION

The present invention provides an imaging element and an imaging apparatus that enable obtaining signals from a plurality of pixel units and performing a plurality of signal processes.

An imaging element of one embodiment of the present invention obtains signals from a plurality of pixel units and perform a plurality of signal processes, comprising: a setting unit configured to set an output condition for pixel signals with respect to first and second photoelectric conversion units included in each of the pixel units; and a signal processing unit configured to execute a first signal process that generates image signals from the signals of the first and second photoelectric conversion units, and a second signal process that corrects the signals of the first and second photoelectric conversion units and performs focus detection.

Further features of the present invention will become apparent from the following description of exemplary embodiments with reference to the attached drawings.

BRIEF DESCRIPTION OF THE DRAWINGS

FIG. 1 is a block diagram illustrating a configuration of an imaging apparatus according to a first embodiment of the present invention.

FIG. 13 is a schematic diagram illustrating a signal readout of the imaging element according to the second embodiment.

FIG. 15 is a schematic diagram illustrating a signal readout of the imaging element according to a modification of the second embodiment.

DESCRIPTION OF THE EMBODIMENTS

Figure 2A:
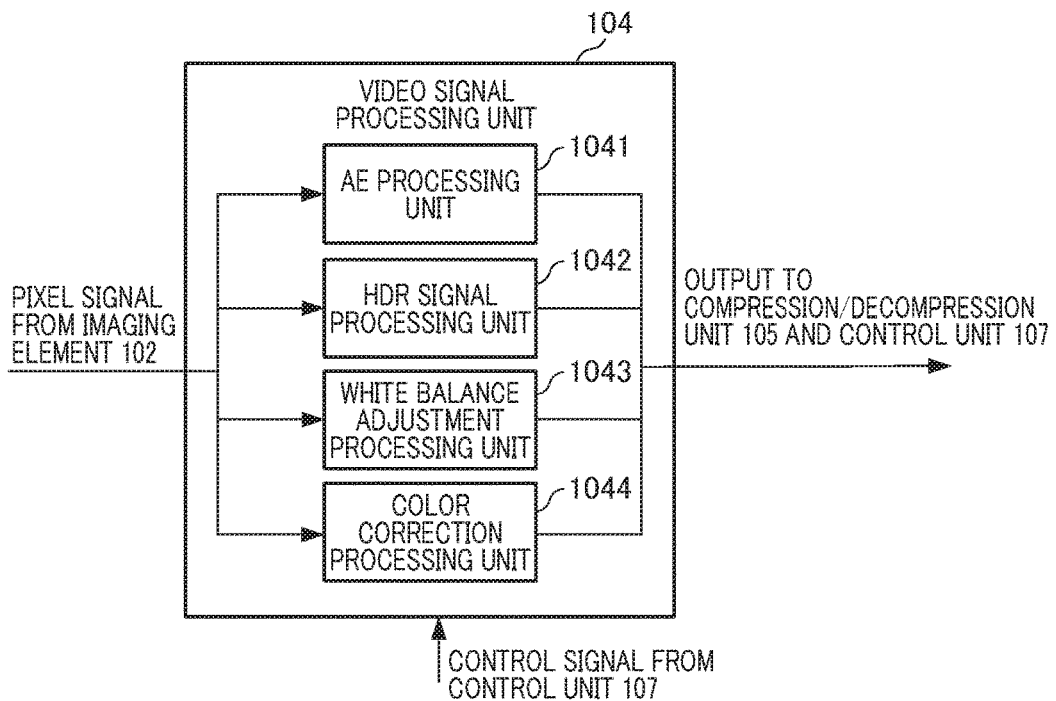
FIGS. 2A and 2B are block diagrams illustrating a configuration of a video image signal processing unit and a phase difference signal processing unit of FIG. 1.

Hereinafter, preferred embodiments of the present invention will be described in detail based on attached drawings. An imaging apparatus of each embodiment is applicable to a digital still camera having a video function, a video camera, and the like.

(Summary of Embodiments)

First, a description will be given of the summary of an imaging element, an imaging apparatus, and a method for processing imaging signals according to the embodiments of the present invention before describing each embodiment in detail. The present invention is applicable to an imaging element in which a pixel unit has a plurality of photoelectric conversion units, and an imaging apparatus provided with the imaging element. Each pixel unit has first and second photoelectric conversion units that enable the setting of output conditions of pixel signals. The output conditions of the pixel signals are, for example, conditions such as the ISO sensitivity of pixels, the exposure time, the optical diaphragm, the degree of amplification of gain amplifier, and the condition obtained by combining a plurality of conditions. An exposure setting value may be optionally changed.

The imaging element and the imaging apparatus according to the embodiments of the present invention enable obtaining signals from a plurality of pixel units and performing a plurality of signal processes. A first signal process is, for example, a generating process of an image signal having a wide dynamic range, and a second signal process is, for example, a focus detection process.

In the first embodiment, an HDR process that generates a video image signal from the signals of the first and second photoelectric conversion units included in each of the pixel units is performed, and a focus detection process is performed by correcting the signals of the first and second photoelectric conversion unit. Additionally, in the second embodiment, a process in which a first signal to be used for the HDR process and a second signal to be used for the focus detection are respectively selected from among the signals of the first and second photoelectric conversion units by a signal selection unit will be described. These signal processes are executed in parallel based on pixel signals for one frame image that has been shot. Accordingly, it is possible to prevent the occurrence of image blur of an object with a large moving amount or reduce image blur, which cause a problem if each process is executed over a plurality of frames.

Additionally, the imaging element has two control modes, that is, a first control mode that performs only focus detection calculation and a second control mode that performs the focus detection calculation and the HDR process. The control unit switches the control modes to change a content of the signal process with respect to signals obtained by an imaging section. For example, if the focus detection calculation of the phase difference detection method is performed by a first control mode, the phase difference is detected based on an image (parallax image) signal having parallax output from a plurality of photoelectric conversion units in the pixel unit. If "image A signal" is obtained from the output of the first photoelectric conversion unit and "image signal B" is obtained from the output of the second photoelectric conversion unit, correlation calculations with respect to the image signal A and the image signal B are performed, and then a focus deviation amount is calculated from the calculation result. Additionally, in the second control mode, a calculation of the phase difference detection method and the HDR process are executed to an image obtained by a single imaging operation, in other words, the image signals for one frame. Note that the embodiments of the present invention are not limited to the phase difference detection method. The embodiments of the present invention are applicable to a focus detection process and a contrast detection process based on a refocusing process by shift addition, or a combination method obtained by combining a plurality of detection methods.

In the first and second embodiments, a description will be given of a configuration of the pixel unit by exemplifying the photoelectric conversion units that are divided into two in the horizontal direction, which is a pupil division direction. The embodiments of the present invention include the photoelectric conversion units that are divided into more than two, for example, four, six, or nine. Additionally, the shape of the photoelectric conversion unit is not limited to being a rectangle, and the present invention is applicable to a photoelectric conversion unit designed to be a polygon such as a hexagon.

(First Embodiment)

In the first embodiment of the present invention, a description will be given of an imaging element and an imaging apparatus that enable the phase difference detection while performing HDR imaging, with reference to FIG. 1 to FIG. 10. A configuration of the imaging apparatus will be described with reference to FIG. 1. An optical barrel 101 is provided with a lens for collecting light from an object to an imaging element 102. A focusing mechanism unit 1011 is configured by a focus lens that performs focus adjustment and a focus control circuit. A zooming mechanism unit 1012 is configured by a zoom lens that changes an imaging magnification of an imaging optical system, and a zoom control circuit. An aperture mechanism unit 1013 adjusts an amount of light that is incident to the imaging element 102. A shutter mechanism unit 1014 adjusts a shutter time in accordance with exposure control. The focusing mechanism unit 1011, the zooming mechanism unit 1012, the aperture mechanism unit 1013, and the shutter mechanism unit 1014 are driven based on control signals from a control unit 107.

The imaging element 102 receives light from the imaged object and performs photoelectric conversion. The imaging element 102 is, for example, a CMOS (Complementary Metal Oxide Semiconductor) image sensor employing the XY reading method, and is configured by pixel units that can read out signals corresponding to different pupil planes and an analog/digital (AD) converter. The imaging element 102 implements imaging operations such as exposure, signal readout, and reset in response to the control signals from the control unit 107, and imaging signals are output.

A video signal processing unit 104 performs various signal processes under the control of the control unit 107. The details of the video signal processing unit 104 will be described below with reference to FIG. 2A. A compression/decompression unit 105 is operated under the control of the control unit 107, and performs a compression encoding process with a still image data format of the predetermined method with respect to image signals from the video signal processing unit 104. For example, a JPEG (Joint Photographic Coding Experts Group) method and the like are used. Additionally, the compression/decompression unit 105 performs an expansion decoding process to encoded data of a still image supplied from an image recording unit 111 via the control unit 107. Moreover, it is possible to execute a compression encoding/expansion encoding process of a moving image by using the MPEG (Moving Picture Experts Group) method and the like.

A phase difference signal processing unit 106 obtains pixel signals (phase difference signals) corresponding to different pupil planes from the imaging element 102, and performs a phase difference detection process. The phase difference signal processing unit 106 will be described below with reference to FIG. 2B. Phase difference detection signals calculated by the phase difference signal processing unit 106 are transmitted to the control unit 107.

The control unit 107 integrally controls each unit of the imaging apparatus. The control unit 107 is a micro controller configured by, for example, a CPU (Central Processing Unit), a ROM (Read Only Memory), and a RAM (Random Access Memory). The control unit 107 executes a program stored in the ROM and the like and performs various processes. For example, the control unit 107 calculates a defocus amount that indicates a focus state of the imaging optical system based on the phase difference detection signals. The control unit 107 calculates a drive amount of the focus lens that is necessary for obtaining the focus state based on the calculated defocus amount, and transmits drive control signals to the focusing mechanism unit 1011. The focusing mechanism unit 1011 drives an AF (automatic focus adjustment) mechanism and moves the focus lens to a target position, in accordance with the drive control signals from the control unit 107.

A light emitting unit 108 is a device that irradiates light to an object if an exposure value of the object is determined to be low by an AE (automatic exposure) process performed by the video signal processing unit 104. The light emitting unit 108 is, for example, a flash device using a xenon tube, and an LED light emitting device. The operation unit 109 is configured by, for example, various operation keys such as a shutter release button, and configured by, for example, a lever, a dial, a touch panel. The operation unit 109 outputs instruction signals in response to an input operation by a user to the control unit 107.

The image display unit 110 is provided with, for example, a display device such as an LCD (Liquid Crystal Display) and an interface circuit for the display device. The image display unit 110 generates image signals for the display on the display device from the image signals supplied from the control unit 107, outputs the image signals to the display device, and displays the image on the screen.

The image recording unit 111 is provided with a recording medium, for example, a portable semiconductor memory, an optical disk, a HDD (Hard Disk Drive), and a magnetic tape. The image recording unit 111 obtains the image data file encoded by the compression/decompression unit 105 from the control unit 107 and records the file on the recording medium. Additionally, the image recording unit 111 reads out the specified data from the recording medium based on the control signals from the control unit 107, and outputs the data to the control unit 107.

Next, with reference to FIG. 2A, a configuration of the video signal processing unit 104 will be described. The video signal processing unit 104 obtains pixel signals from the imaging element 102, performs signal processes including a correcting process that corrects any defects of the pixels and a variation of the signals caused by the imaging element 102, the HDR process, a white balance adjusting process, a gamma process, a color correcting process, and then outputs the video image signals. Additionally, the video signal processing unit 104 detects the brightness of each region in order to control the exposure of the imaging element 102 and performs the AE (automatic exposure) process that calculates a proper exposure. In this example, an AE processing unit 1041, an HDR signal processing unit 1042, a white balance adjustment processing unit 1043, and a color correction processing unit 1044 are provided in the video signal processing unit 104. The HDR signal processing unit 1042 combines a plurality of signals having an exposure difference (for example, the image signal A and the image signal B) and performs a generating process of the image signals in which a dynamic range is expanded. The HDR process executed by the HDR signal processing unit 1042 will be described below. The image signals after the signal process is output to the compression/decompression unit 105 and the control unit 107.

Figure 2B:
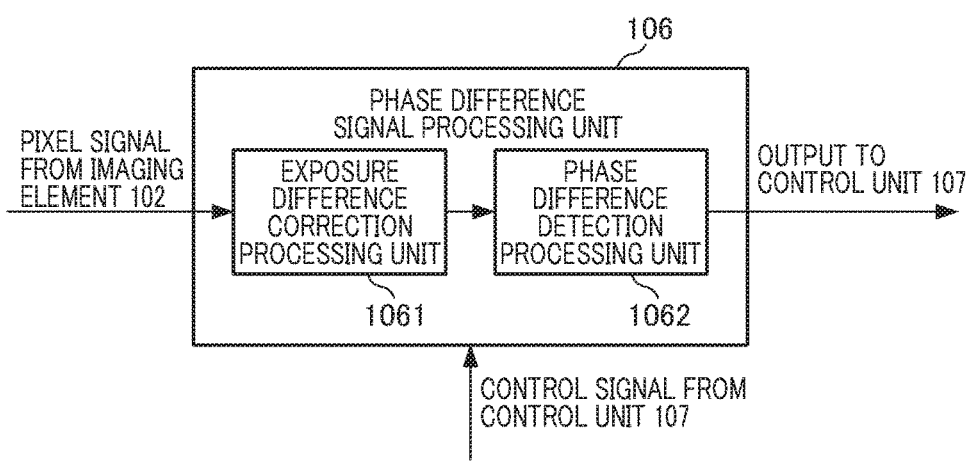

FIG. 2B illustrates a configuration example of the phase difference signal processing unit 106. The phase difference signal processing unit 106 obtains pixel signals (phase difference signals) corresponding to different pupil planes from the imaging element 102, and performs the phase difference detection process by using the phase difference signals. Accordingly, phase difference detection signals are obtained. However, in the present embodiment, imaging setting is performed such that an exposure difference is caused between the pixel signals corresponding to the different pupil planes. Accordingly, an exposure difference correction processing unit 1061 executes a process that corrects the exposure difference between the pixel signals corresponding to the different pupil planes, with respect to the phase difference signals obtained from the imaging element 102. The exposure difference correcting process performed by the exposure difference correction processing unit 1061 will be described below. The signals in which the exposure difference between the pixel signals corresponding to the different pupil planes are corrected are transmitted to a phase difference detection processing unit 1062, and then the phase difference detection process is performed.

Figure 3:
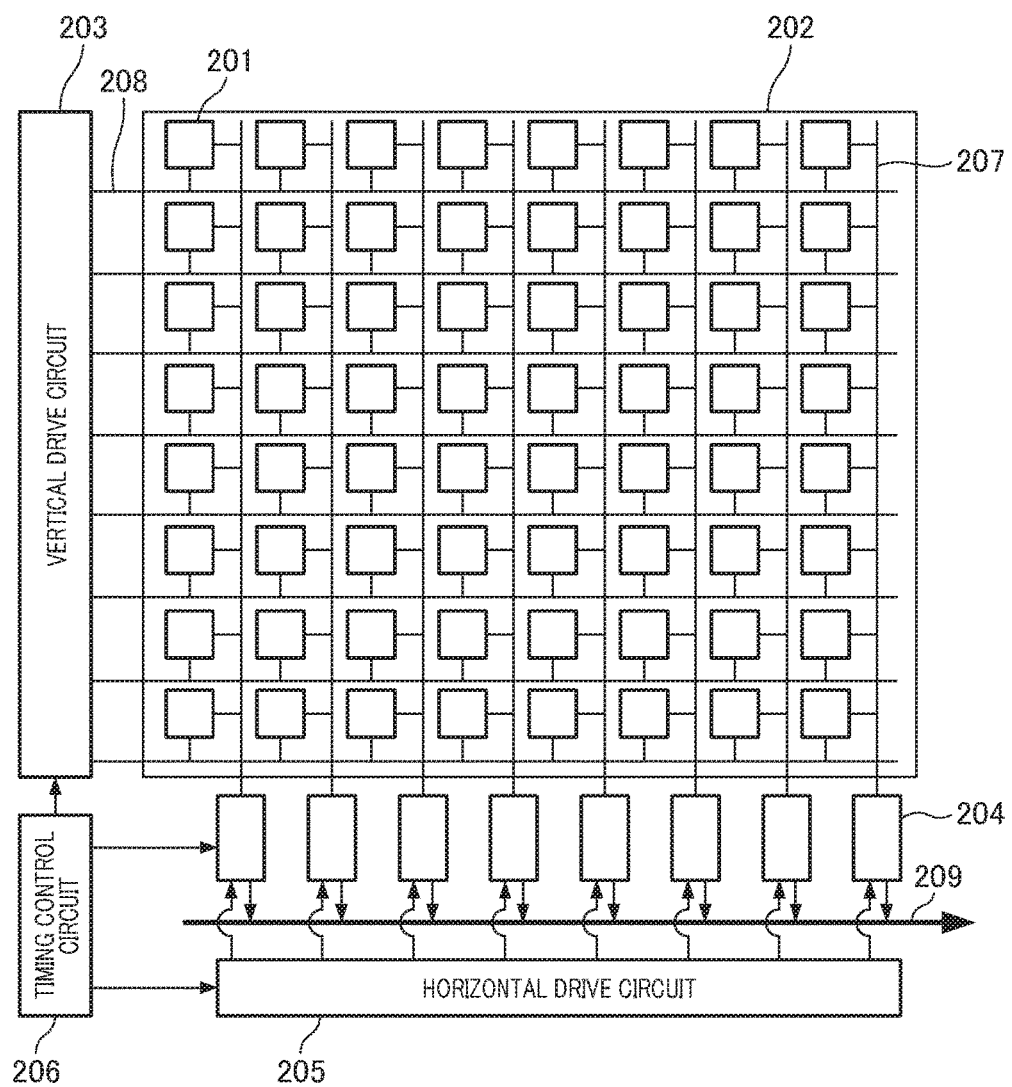
FIG. 3 is a block diagram illustrating configurations of an imaging element according to the embodiments of the present invention.

With reference to FIG. 3, a description will be given of a configuration of the imaging element 102 in the present embodiment. The imaging element 102 is configured by, for example, a pixel array portion 202 in which a plurality of pixel units 201 is arranged in a matrix of rows and columns on a semiconductor substrate using silicon (Si), and its peripheral circuit portion. The peripheral circuit portion includes a vertical drive circuit 203, column signal processing circuits 204, a horizontal drive circuit 205, a timing control circuit 206, and the like.

The pixel unit 201 is provided with a photodiode serving as a photoelectric conversion unit, and a plurality of pixel transistors. The details of the pixel unit 201 will be described below with reference to FIG. 4 and FIG. 7. The pixel transistors are, for example, MOS (metal oxide semiconductor) transistors such as transfer transistors, amplification transistors, selection transistors, and reset transistors.

The vertical drive circuit 203 is configured by, for example, a shift register. The vertical drive circuit 203 selects a pixel drive wiring line 208, supplies a pulse for driving the pixel unit 201 with the pixel drive wiring line 208 that has been selected, and drives the pixel units 201 in row units. The vertical drive circuit 203 sequentially selects and scans each pixel unit 201 on the pixel array portion 202 in row units in the vertical direction. The pixel signals, which are based on a signal electric charge generated in the photoelectric conversion unit of each pixel unit 201 in response to an amount of incident light, are supplied to the column signal processing circuit 204 via vertical signal line 207.

The column signal processing circuits 204 are arranged for each column of the pixel units 201, and perform a signal process such as noise removal for each pixel column with respect to the pixel signals output from the pixel units 201 for one row. For example, the column signal processing circuit 204 performs a CDS process for removing a pixel-specific fixed pattern noise, a multiplication process of the pixel signals of the pixel unit 201 that have been output through the vertical signal line 207, and a signal process such as AD conversion. CDS is an abbreviation for "Correlated Double Sampling".

The horizontal drive circuit 205 is configured by, for example, a shift register, and selects each of the column signal processing circuits 204 in order by sequentially outputting the horizontal scan pulses. Pixel signals from the column signal processing circuits 204 are output to a horizontal signal line 209. The timing control circuit 206 receives input clock signals and data that provides an instruction for an operation mode and the like from the control unit 107. The timing control circuit 206 generates a clock signal and a control signal that serve as references for the operation of the vertical drive circuit 203, the column signal processing circuit 204, the horizontal drive circuit 205, and the like, based on vertical synchronizing signals, horizontal synchronizing signals, and master clock signals.

Figure 4A:
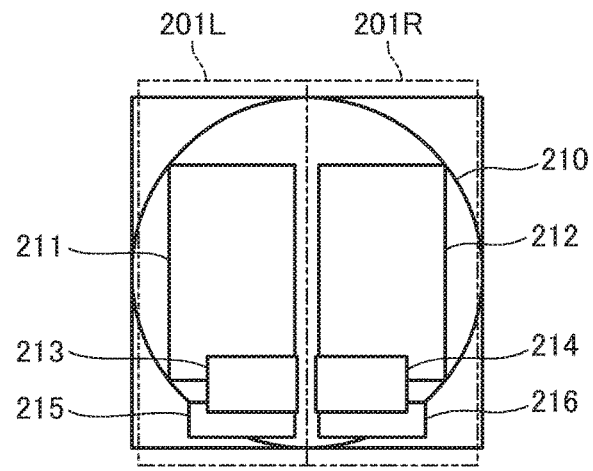
FIGS. 4A and 4B illustrate a configuration and an arrangement of pixels of the imaging element according to the embodiments of the present invention.

A description will be given of a configuration and an arrangement of the pixel units 201 of the imaging element 102, with reference to FIG. 4. FIG. 4A is a schematic diagram illustrating a configuration example of photoelectric conversion units 201L and 201R that receive lights that have respectively passed through different partial pupil regions of the imaging optical system. The photoelectric conversion units 201L and 201R are respectively provided with photodiodes 211 and 212. "L" stands for the arrangement at the left when viewed from the front, and "R" stands for the arrangement at the right when viewed from the front. Hereinafter, "PD" is an abbreviation for "photodiode".

The photoelectric conversion unit 201L receives light that has passed through a part of the pupil region of the imaging optical system (the first partial pupil region). The photoelectric conversion unit 201R receives light that has passed through apart of the pupil region that is different from the first partial pupil region (the second partial pupil region). The photoelectric conversion unit 201L and the photoelectric conversion unit 201R are configured under one microlens 210, and the photoelectric conversion unit 201L has a single PD 211 and the photoelectric conversion unit 201R has a single PD 212. A transfer transistor 213 reads out signals of the PD 211 and a transfer transistor 214 reads out signals of the PD 212. A floating diffusion (FD) portion 215 temporarily accumulates the signals of the PD 211 and a floating diffusion (FD) portion 216 temporarily accumulates the signals of the PD 212. The configurations of the two photoelectric conversion units are the same, except for a feature in which the PD 211 and the PD 212 read out the signals that are photoelectrically converted from the light that has passed thorough the different partial pupil regions of the imaging optical system.

The pixel signals obtained from the photoelectric conversion units 201L and 201R respectively pass through the vertical signal lines 207 and the column signal processing circuits 204 (FIG. 3), and are readout to the horizontal signal line 209 at all times by the horizontal drive circuit 205 per row unit. Although each pixel unit is provided with a plurality of configuration elements to be described below other than the configuration elements shown in the drawings, these are not important in the description of the present invention and will therefore be omitted.

Figure 4B:
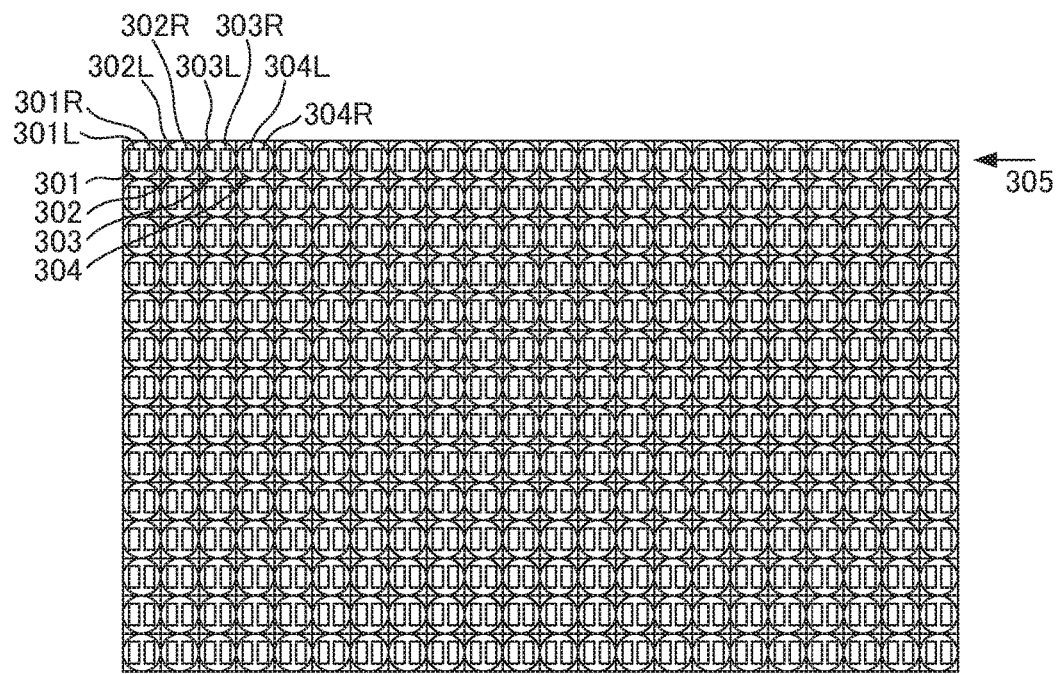

FIG. 4B is a plan view schematically illustrating a pixel arrangement in the imaging element 102. In order to provide a two dimensional image, a plurality of pixel units having a configuration shown in FIG. 4A is arranged in a two dimensional array along with the predetermined directions. The predetermined directions are horizontal and perpendicular directions. Describing pixel units 301, 302, 303, and 304 included in a row 305 as an example, PDs 301L, 302L, 303L, and 304L correspond to the PD 211 of FIG. 4A. The PDs 301R, 302R, 303R, and 304R correspond to the PD 212 of FIG. 4A. A description will be given of a manner of the light reception in the imaging element 102 having a pixel arrangement shown in FIG. 4B, with reference to FIG. 5.

Figure 5:
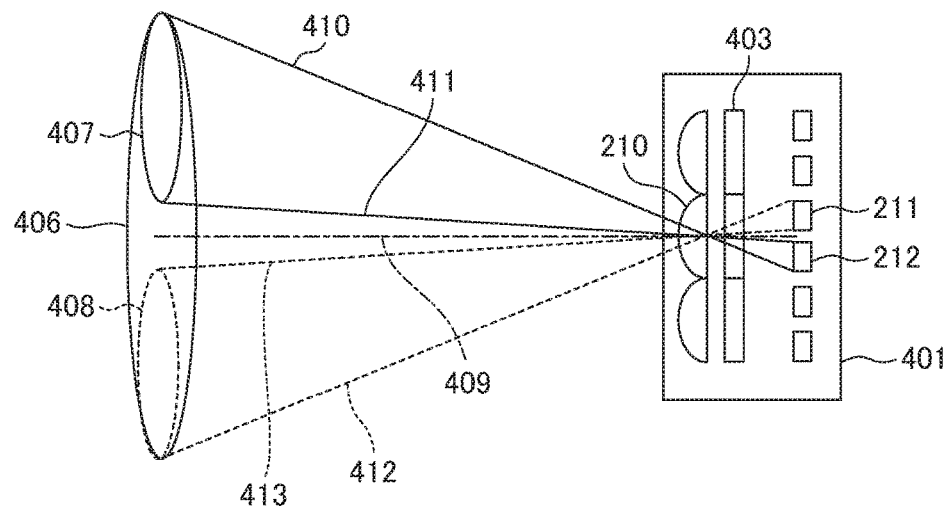
FIG. 5 is a schematic diagram illustrating a relation between an exit pupil and light reception of the imaging element.

FIG. 5 is a schematic diagram illustrating a manner in which a luminous flux emitted from the exit pupil of the image shooting lens is incident to the imaging element 102. A cross-sectional portion 401 of the pixel unit shows the microlens 210, a color filter 403, and the PD 211 and the PD 212. Partial pupil regions 407 and 408 of the exit pupil of the image shooting lens are shown in the exit pupil 406, and these regions are partial pupil regions when viewed from each PD that receives light. The optical axis 409, which is the center of the light flux emitted from the exit pupil 406 with respect to the pixel unit having the central microlens 210, is shown by a dashed line. Light rays 410 and 411 are the outermost light rays passing through the partial pupil region 407, and light rays 412 and 413 are the outermost light rays passing through the partial pupil region 408.

The light that has been emitted from the exit pupil 406 is incident to the imaging element 102 centered about the optical axis 409. As can be seen from FIG. 5, out of the luminous fluxes emitting from the exit pupil 406, the luminous flux above the optical axis 409 is incident to the PD 212 through the microlens 210 and the color filter 403. Additionally, the luminous flux below the optical axis 409 is incident to the PD 211 through the microlens 210 and the color filter 403. In other words, the PD 211 and the PD 212 receive light through the partial pupil regions 407 and 408 that are different regions in the exit pupil 406 of the shooting lens.

Referring to FIG. 4B, for example, in the case of the pixel unit 301 included in the row 305, a PD 301L corresponds to the PD 211 that receives the light flux being emitted from one of the exit pupils (partial region) across the optical axis 409. The PDs 302L, 303L, and 304L are similar to the PD 301L. "image A" serves as an image that is obtained from the PD 301L and the like, and its image signal is referred to as "image signal A". Additionally, a PD 301R corresponds to the PD 212 that receives the light flux being emitted from the other one of the exit pupils (partial region) across the optical axis 409. The PDs 302R, 303R, and 304R are similar to the PD 301R. "image B" serves as an image that is obtained from the PD 301R and the like, and its image signal is referred to as "image signal B".

As described above, the light reception of the PD 211 and the PD 212 is performed by equally dividing the exit pupil 406 into the partial pupil regions 408 and 407 centered about the optical axis 409 so that a phase difference is caused in the output signals between the PD 211 and the PD 212. Specifically, the change of the focus state causes a change (phase difference) in an address interval of the pixel unit 201, in the output of the image signal And the image signal B respectively corresponding to the partial pupil regions 408 and 407. A defocus amount is calculated by detecting (detecting a phase difference)this address interval. The PD 211 and the PD 212 are arranged so as to be equally divided with respect to the optical axis 409. Specifically, the PD 211 and the PD 212 are not eccentric to the exit pupil 406, and accordingly, even if light rays are partially obstructed by components and the like in the optical lens barrel 101, there is a merit of simple handling of a signal loss (shading) of the image A or the image B.

Figure 6:
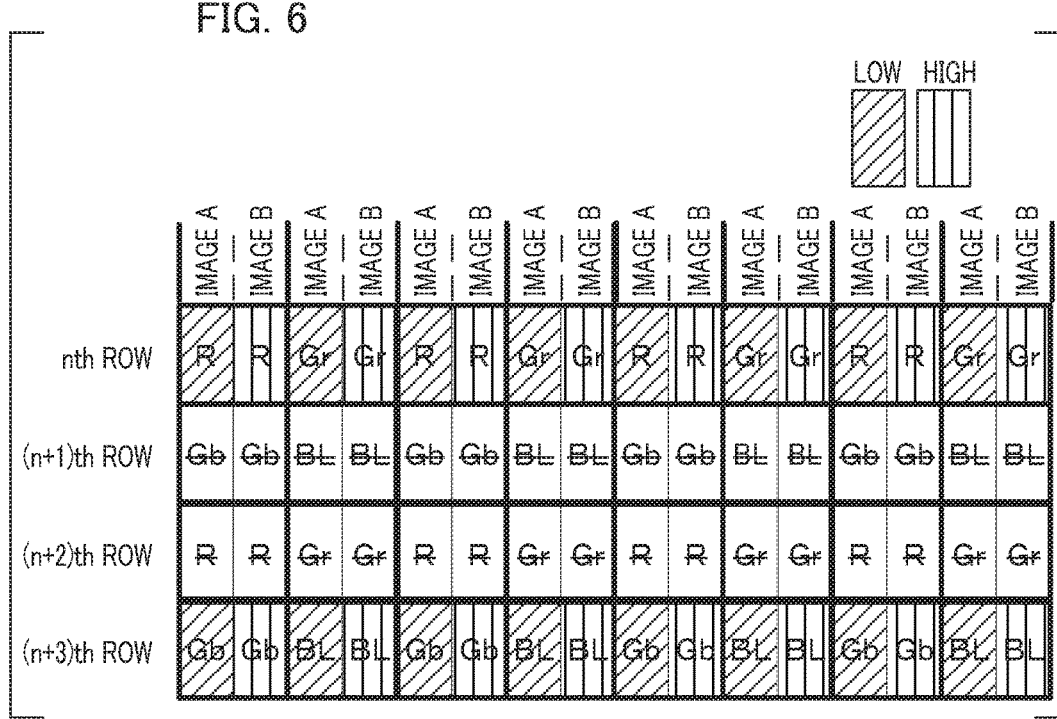
FIG. 6 is a schematic diagram illustrating a signal readout of the imaging element according to the first embodiment.

A description will be given of image signals obtained by the imaging element having a pixel configuration and a pixel arrangement described in FIG. 4, with reference to FIG. 6. FIG. 6 is a schematic diagram illustrating a position where the pixel signals of the photoelectric conversion parts 201L and 201R are readout with respect to the pixel arrangement shown in FIG. 4B. In order to perform the HDR process to be described below, shooting is performed so as to generate a difference in the output levels of the image signal And the image signal B. The first column shown by the image A represents a region of the photoelectric conversion unit 201L in each pixel unit, which is the left column where the PD 211 exists. The photoelectric conversion unit of this column outputs the image signal A as a pixel signal. In contrast, the second column shown by the image B represents a region of the photoelectric conversion part 201R in each pixel unit, which is the right column where the PD 211, exists. The photoelectric conversion unit of this column outputs the image signal B as a pixel signal.

For generating an exposure difference between the photoelectric conversion units 201L and 201R, the different signal output conditions are set in the photoelectric conversion units. For example, the exposure time of the photoelectric conversion unit is individually set in image A and image B. Alternatively, the column signal processing circuits 204 set different multiplication degrees in an amplification process in each output of the image A and the image B. Alternatively, different conditions such as exposure time, multiplication degree (amplification degree), or sensitivity may be set differently between the image A and the image B to generate the exposure difference.

In the present embodiment, a description will be given by using a pixel imaged with an exposure time of long-second accumulation as a high exposure pixel and by using a pixel imaged with an exposure time of short-second accumulation as a low exposure pixel. In FIG. 6, a description will be given by using a photoelectric conversion unit shown by oblique hatched lines as a low exposure pixel, and by using a photoelectric conversion unit shown by vertical hatched lines as a high exposure pixel. Note that in the present embodiment, a description will be given by assuming that the image signal A is read out from the low exposure pixel, and the image signal B is read out from the high exposure pixel. This is not limiting, and an embodiment in which the image signal A is read out from the high exposure pixel and the image signal B is read out from the low exposure pixel may be employed. FIG. 6 illustrates pixel units included from the n-th row to the (n+3)th row. The photoelectric conversion units that do not read out the pixel signals are shown in a state of being outlined without hatching, and a strikethrough is drawn for each of the characters of red (R), green (Gr, Gb), and blue (BL) in the Bayer arrangement.

In the example of FIG. 6, the n-th row and the (n+3)th row are readout rows (video image row), and the (n+1)th row and the (n+2)th are non-readout rows. In the n-th row, the photoelectric conversion units of the image A column output the pixel signals with low exposure corresponding to each of the R filter and Gr filter, and the photoelectric conversion units in the image B column output the pixel signals with high exposure corresponding to each of the R filter and Gr filter. In each pixel unit in the (n+1)th row and the (n+2)th row, signal readout is not performed. In the (n+3)th row, the photoelectric conversion units in the image A column output pixel signals with low exposure corresponding to each of the Gb filter and the BL filter, and the photoelectric conversion units in the image B column output pixel signals with high exposure corresponding to each of the Gb filter and the BL filter. Specifically, as video image signals, the imaging element is driven by thinning out two rows. Note that, in the present embodiment, although the row-thinning out drive method is described to serve as a more suitable drive for video image shooting and the like, the read-out operation for all rows may be performed without the thinning-out operation.

As described above, the pixel signals read out with an exposure difference between the image signal A and the image signal B are transmitted from the imaging element 102 to the HDR signal processing unit 1042 in the video signal processing unit 104 and the exposure difference correction processing unit 1061 in the phase difference signal processing unit 106. In each processing unit, the HDR process and the exposure difference correcting process to be described below are executed.

Figure 7:
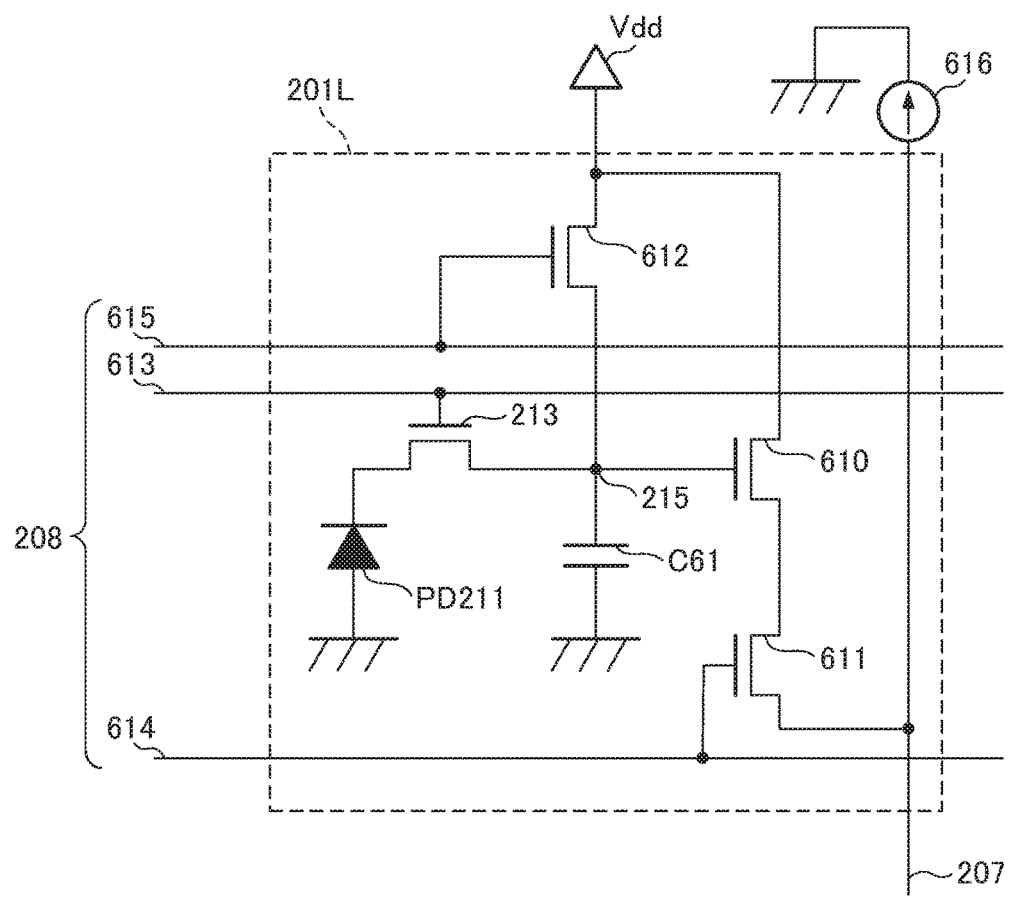
FIG. 7 is a circuit configuration diagram of the imaging element according to the embodiments of the present invention.

Next, with reference to FIG. 7, a description will be given of a circuit configuration and the basic operation of the imaging element 102 in the present embodiment. FIG. 7 is an equivalent circuit diagram illustrating a circuit configuration of the pixel unit having the configurations shown in FIG. 3 and FIG. 4. Since the photoelectric conversion units 201L and 201R have similar circuit configurations, only the photoelectric conversion unit 201L will be described. The photoelectric conversion unit 201L is provided with the PD 211 and a plurality of transistors. The transfer transistor 213, an amplification transistor 610, a selection transistor 611, and a reset transistor 612 are each n-channel MOSFET (MOS Field-Effect Transistor).

Signal lines of a transfer signal 613, a row selection signal 614, and a reset control signal 615 are respectively connected to each gate of the transfer transistor 213, the selection transistor 611, and the reset transistor 612. The pixel driving wiring lines 208 include a wire that supplies the transfer signal 613, the row selection signal 614, and the reset control signal 615 with the gage of each transistor. These signals simultaneously drive the pixel units extending in the horizontal direction, in other words, the pixel units included in the same row. Accordingly, it is possible to control a rolling shutter operation of a line-sequentially operating type and a global shutter operation of an all rows simultaneous operating type. Additionally, the transfer signal 613 is individually controlled by the photoelectric conversion parts 201L and 201R, by which different exposure times can be set in each photoelectric conversion unit. Additionally, the vertical signal line 207 is connected to the source of the selection transistor 611 and one end of the vertical signal line 207 is grounded via a constant current source 616.

The PD 211 is an element that accumulates an electric charge generated by photoelectric conversion. The P side of the PD 211 is grounded and the N side thereof is connected to the source of the transfer transistor 213. If the transfer transistor 213 is turned on by the transfer signal 613, an electric charge of the PD 211 is transferred to the FD portion 215. The FD portion 215 has a parasitic capacitance C61, to which the electric charge is accumulated. In the amplification transistor 610, a power supply voltage Vdd is applied to a drain, and the gate is connected to the FD portion 215. The amplification transistor 610 amplifies and outputs the voltage of the FD portion 215. A selection transistor 611 selects a pixel unit that reads out signals per row unit. In the selection transistor 611, the drain is connected to the source of the amplification transistor 610, and the source is connected to the vertical signal lines 207. If the selection transistor 611 is turned on by the row selection signal 614, the amplification transistor 610 and the constant current source 616 configure a source follower circuit so that the voltage corresponding to the voltage of the FD portion 215 is output to the vertical signal line 207. In a reset transistor 612, the power supply voltage Vdd is applied to the drain, and the source is connected to the FD portion 215. The reset transistor 612 resets the voltage of the FD portion 215 to the power supply voltage Vdd.

Figure 8:
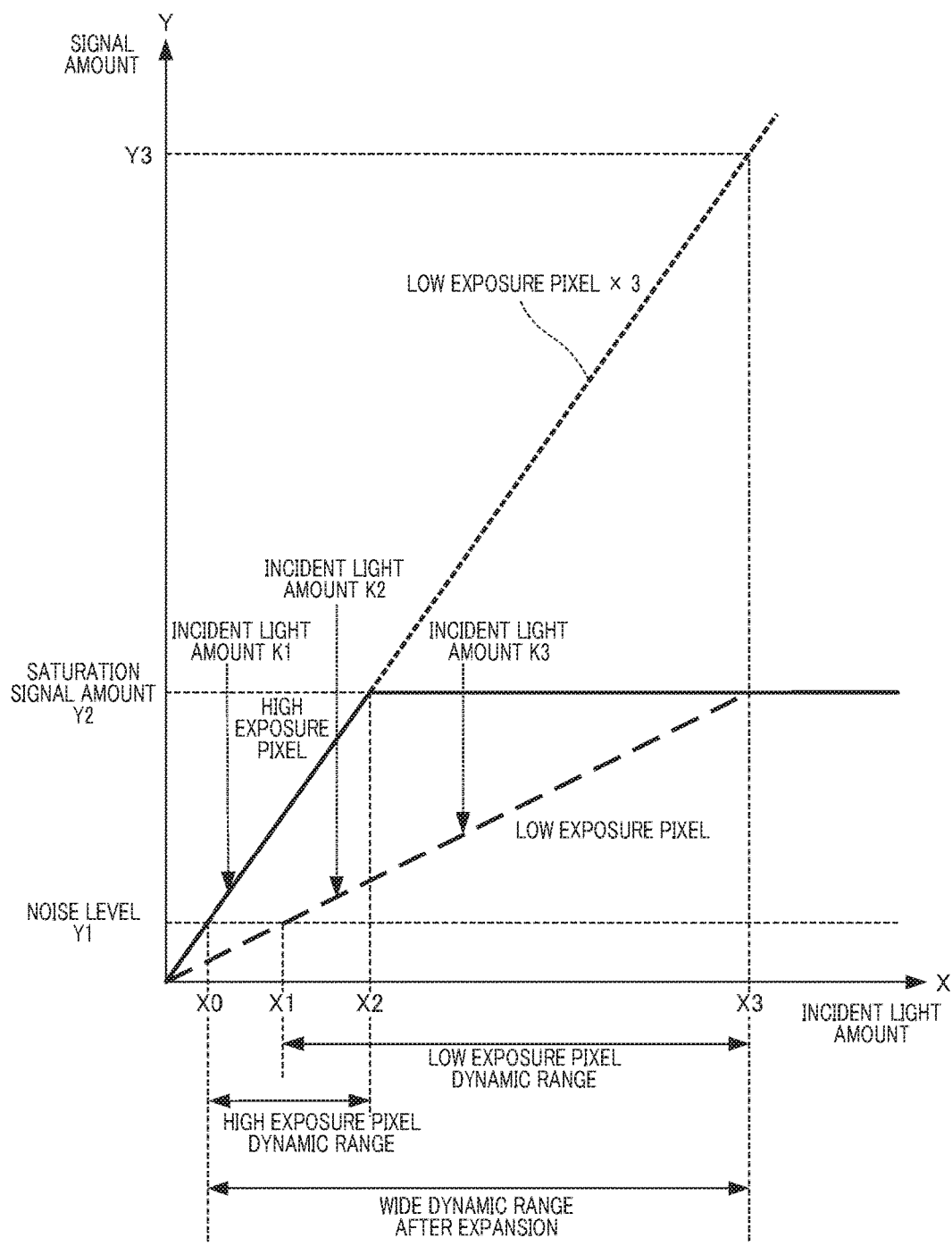
FIG. 8 is an explanatory diagram of an HDR process according to the embodiments of the present invention.

With reference to FIG. 8, a dynamic range expanding process will be described. FIG. 8 illustrates a relation between the incident light amount (see X-axis) and the signal amount (see Y-axis) in the dynamic range expanding process. The X-axis, which is the horizontal axis, illustrates the incident light amount Xj (j=0, 1 to 3), and the Y-axis, which is the vertical axis, illustrates the signal amount Yk (k=1 to 3). Y1 shows a noise level and Y2 shows a level of a saturation signal amount, in which these can be calculated based on a signal amount of the low exposure pixel.

In the high exposure pixel, the signal amount reaches the saturation signal amount Y2 if the incident light amount reaches X2, and in the low exposure pixel, the signal amount reaches the saturation signal amount Y2 if the incident light amount reaches X3. In contrast, if the signal amount obtained by light reception is equal to or less than Y1, it corresponds to the noise level, so that pixel signal cannot be used. Hence, a dynamic range of the high exposure pixel is within the range from X0 to X2 of the incident light amount, and a dynamic range of the low exposure pixel is within the range from X1 to X3 of the incident light amount.

For example, a case in which "low exposure pixel:high exposure pixel=1:3" is set as the exposure ratio between the low exposure pixel and the high exposure pixel is assumed. The incident light amount of the pixel unit 201 is denoted by three kinds of K1, K2, and K3, and "K1<K2<K3" is defined. The HDR signal processing unit 1042 determines pixel signals after a dynamic range expanding process by the following formula (1) regarding the pixel unit 201 of the incident light amount K1.

$$\text{The pixel signal after the HDR process}=\text{high exposure pixel signal}\times 1+\text{low exposure pixel signal}\times 0 \quad (1)$$

Additionally, the HDR signal processing unit 1042 determines a pixel signal after the dynamic range expanding process by the following formula (2) regarding the pixel unit 201 of the incident light amount K2.

$$\text{The pixel signal after the HDR process}=\text{high exposure pixel signal}\times(1-\alpha)+\text{low exposure pixel signal}\times\alpha\times 3 \quad (2)$$

$\alpha$ in formula (2) represents the synthesis ratio ($0\leq\alpha\leq 1$). Furthermore, the HDR signal processing unit 1042 determines a pixel signal after the dynamic range expanding process by the following formula (3) regarding the pixel unit 201 of the incident light amount K3.

$$\text{The pixel signal after the HDR process}=\text{high exposure pixel signal}\times 0+\text{low exposure pixel signal}\times 3 \quad (3)$$

As described above, the HDR signal processing unit 1042 calculates a pixel signal after the HDR process by using the formulae (1) to (3), in response to a signal amount (an incident light amount) of each of the pixel units 201 of the pixel array portion 202. In the example, although a case of the incident light amounts K1, K2, and K3 is described, it is possible to calculate the pixel signals after the dynamic range expanding process by using the formula corresponding to four or more kinds of incident light amounts. The HDR signal processing unit 1042 obtains the image signal A and the image signal B having an exposure difference in a single shooting, combines the image signal A and the image signal B, and thereby generates a wide dynamic range image in which the signal amount range is expanded from Y1 to Y3. Specifically, the dynamic range after expansion is within the range from X0 to X3.

Figure 9:
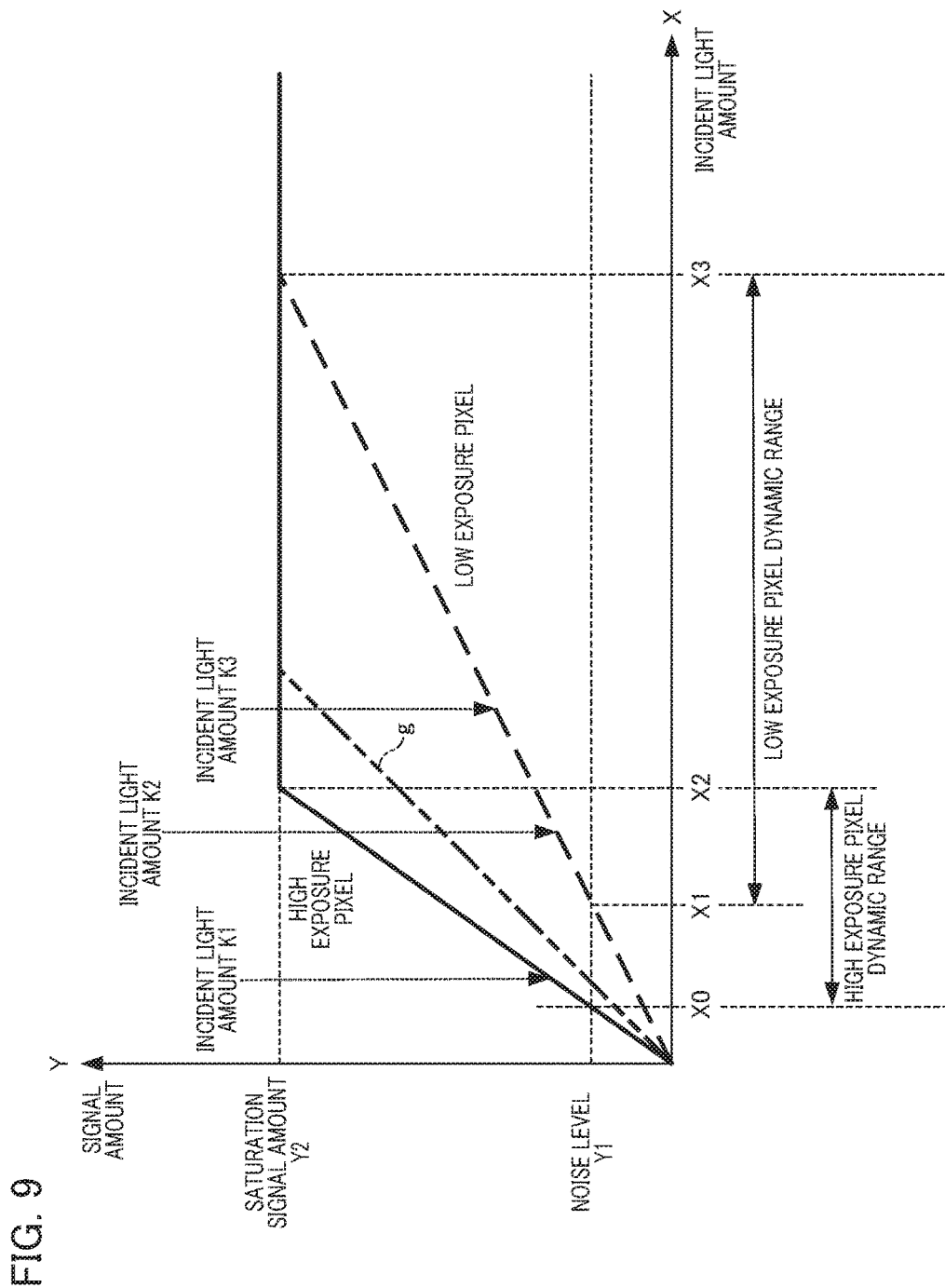
FIG. 9 is an explanatory diagram of an exposure difference correcting process according to the first embodiment.

Next, with reference to FIG. 9, the exposure difference correcting process will be described. FIG. 9 illustrates a relation between the incident light amount and the signal amount in the exposure difference correcting process. The settings for the horizontal axis (X-axis) and the vertical axis (Y-axis) are the same as that in FIG. 8. A case in which the exposure ratio between the low exposure pixel and the high exposure pixel is set to "low exposure pixel:high exposure pixel=1:3" will be described. The exposure difference correction processing unit 1061 determines a high exposure pixel signal and a low-exposure pixel signal after exposure difference correction with respect to each of the high exposure pixel and the low exposure pixel of the incident light amount K1 by the following formula (4).

$$\text{The high exposure pixel signal after exposure difference correction}=\text{high exposure pixel signal}\times(2+\beta)/3$$

$$\text{Low exposure pixel signal after exposure difference correction}=\text{low exposure pixel signal}\times(2-\beta) \quad (4)$$

$\beta$ in the formula (4) is an adjustment coefficient used for the exposure difference correction, and $\beta$ value is a predetermined positive real number.

Additionally, the exposure difference correction processing unit 1061 determines a high exposure pixel signal and a low exposure pixel signal after the exposure difference correction with respect to each of the high exposure pixel and the low exposure pixel of the incident light amount K2 by the following formula (5).

$$\text{High exposure pixel signal after exposure difference correction}=\text{high exposure pixel signal}\times 2/3$$

$$\text{Low exposure pixel signal after exposure difference correction}=\text{low exposure pixel signal}\times 2 \quad (5)$$

Further, the exposure difference correction processing unit 1061 determines a high exposure pixel signal and a low exposure pixel signal after the exposure difference correction with respect to each of the high exposure pixel and the low exposure pixel of the incident light amount K3 by the following formula (6).

$$\text{High exposure pixel signal after exposure difference correction}=\text{high exposure pixel signal}\times(2-\gamma)/3$$

$$\text{Low exposure pixel signal after exposure difference correction}=\text{low exposure pixel signal}\times(2+\gamma) \quad (6)$$

$\gamma$ in the formula (6) is an adjustment coefficient used for the exposure difference correction, and the $\gamma$ value is a predetermined positive real number.

As described above, the exposure difference correction processing unit 1061 determines a high exposure pixel signal and a low exposure pixel signal after the exposure difference correction by using the formulae (4) to (6) in response to the signal amount (incident light amount) of each pixel unit 201 of the pixel array portion 202. In the example, the case of the incident light amounts K1, K2, and K3 has been described, but it is also possible to calculate the high exposure pixel signal and the low exposure pixel signal after the exposure difference correction by using a formula corresponding to four or more types of incident light amounts. The signals of the high exposure pixel and the low exposure pixel are corrected to pixel signals of the same level as shown by a two-dot chain line "g" in FIG. 9. The exposure difference between the image signal A and the image signal B is corrected to have the signal of the same level so that the phase difference detecting process in the phase difference detection processing unit 1062 becomes possible.

Figure 10:
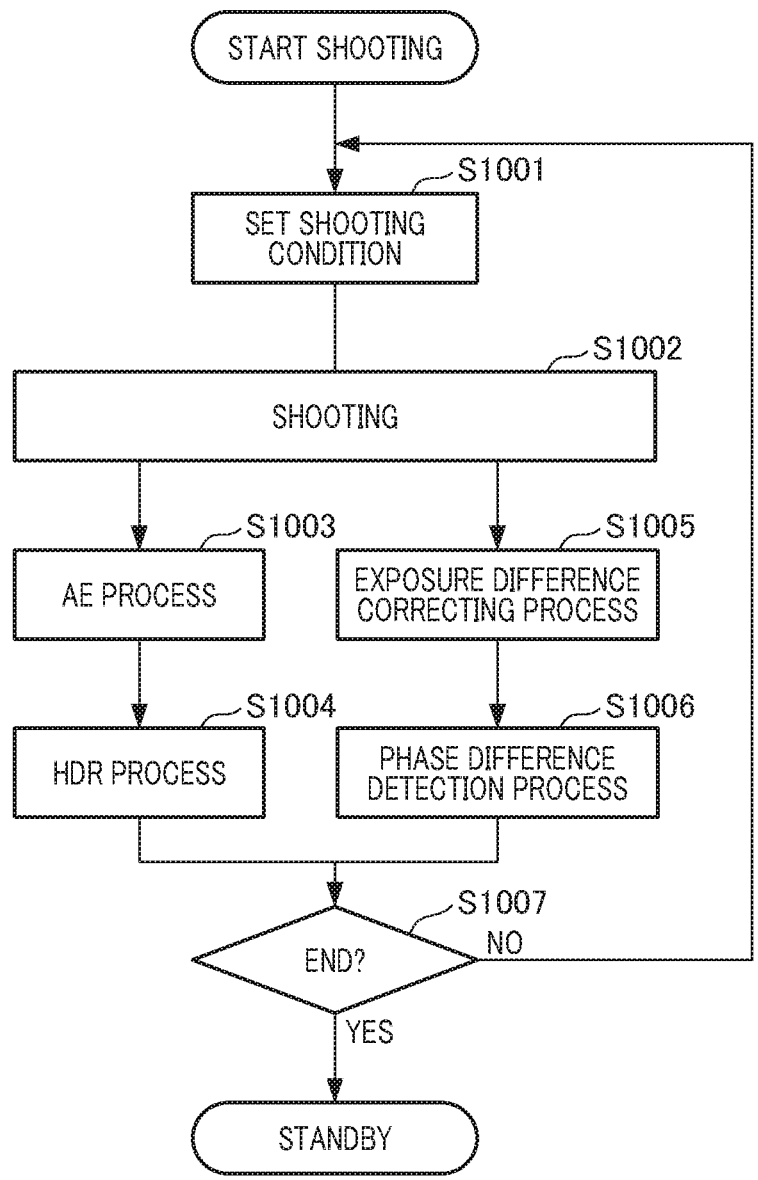
FIG. 10 is a flowchart illustrating a process example according to the first embodiment.

With reference to a flowchart of FIG. 10, a process of the present embodiment will be described. If shooting starts, in S1001, the predetermined shooting condition is set by the control unit 107. Next, in S1002, the imaging element 102 is driven under the control of the control unit 107 in accordance with the shooting condition set in step S1001. A shooting operation by which the HDR process is compatible with the phase difference detection process is performed, and the pixel signals after exposure are obtained. The pixel signals after the exposure are transmitted to the video signal processing unit 104 and the phase difference signal processing unit 106, and the signal processes are subjected to the signals. The HDR signal process and the phase difference detecting process are simultaneously performed from the pixel signals for one frame obtained in a single shooting. That is, the processes shown in S1003 and S1004 and the processes shown in S1005 and S1006 are executed as parallel processes.

The video signal processing unit 104 executes the processes of S1003 and S1004. In step S1003, the AE processing unit 1041 in the video signal processing unit 104 calculates the AE value based on the pixel signals. After the AE process, in step S1004, the HDR signal processing unit 1042 executes the HDR process described in the present embodiment, with respect to the pixel signals obtained from the imaging element 102.

In contrast, the processes of S1005 and S1006 are executed by the phase difference signal processing unit 106. In step S1005, the exposure difference correction processing unit 1061 in the phase difference signal processing unit 106 performs the exposure difference correcting process described in the present embodiment based on the pixel signals. In step S1006, the phase difference detection processing unit 1062 performs phase difference detection using the signals to which the exposure difference correction process has been performed in step S1005, in other words, performs phase difference detection using the image signal A and the image signal B corresponding to each of the different partial pupil regions. Specifically, the phase difference detection processing unit 1062 performs correlation calculation while relatively shifting the two images, detects an image deviation amount based on the correlation calculation result, and performs a known phase difference detection that converts this amount into a defocus amount. The phase difference detection processing unit 1062 performs gain correction after converting the RGB signal to the luminance signal, adjusts the output levels of the image signal A and the image signal B, and then performs phase difference detection. Adjustment of the output level includes a first adjustment process that matches the image signal A to the image signal B, and, on the contrary, a second adjustment process that matches the image signal B to the image signal A. In the case of obtaining the image signal A from the output of the photoelectric conversion unit of the short exposure condition (low exposure) and obtaining the image signal B from the output of the photoelectric conversion unit of the long exposure condition (high exposure), the mage signal A has fewer noise components. Therefore, it is advantageous for noise reduction to correct the level of the image signal A (luminance signal) and to be matched with the level of the image signal B. Additionally, a process that changes exposure conditions such as an exposure time and a gain value is performed in accordance with the brightness of the object with respect to each photoelectric conversion unit. It is possible to select the first adjustment process and the second adjustment process in accordance with the shooting state (for example, the brightness of the entire image or the object region, and the AE value,).

After the processes of S1004 and S1006 end, the process proceeds to step S1007. The control unit 107 determines whether or not the shooting will end. If the control unit 107 determines that shooting will end, the process shifts to a standby state. In contrast, if the control unit 107 determines that shooting will be continued, the process returns step S1001. The shooting condition is reset based on the AE value obtained in S1003 and the shooting is continued. In the present embodiment, the phase difference detection is enabled while generating an HDR image by using the imaging element of a configuration having pupil division pixels in which a plurality of photoelectric conversion units corresponds to one microlens. That is, video image signals subjected to the HDR process and imaging plane phase difference detecting signals can be obtained simultaneously by a single shooting operation. Additionally, the pixel signals are obtained from the pixel units of the same row and the phase difference detection is performed using the corrected signals so that no readout step occurs in the vertical direction. That is, if the phase difference detection is performed by obtaining the signals from the photoelectric conversion units included in each of the pixel units in different rows, a deviation of the detection position occurs. However, in the present embodiment, since such a positional deviation does not occur, detection accuracy is high.

In the embodiment having four photoelectric conversion units in which each pixel unit is divided into two in the horizontal and vertical directions, different output conditions of the pixel signals can be set for each photoelectric conversion unit. In other words, for phase difference detection, it is not necessary to set the output conditions for the two photoelectric conversion units in the pixel unit to be the same. Accordingly, it is possible to increase the exposure ratio and further expand the dynamic range.

(Second Embodiment)

A second embodiment of the present invention will be described with reference to FIGS. 11 to 14. In the present embodiment, the same reference numerals are used for the same components as those in the first embodiment, so that the detailed explanation thereof will be omitted and mainly the differences will be explained.

Figure 11:
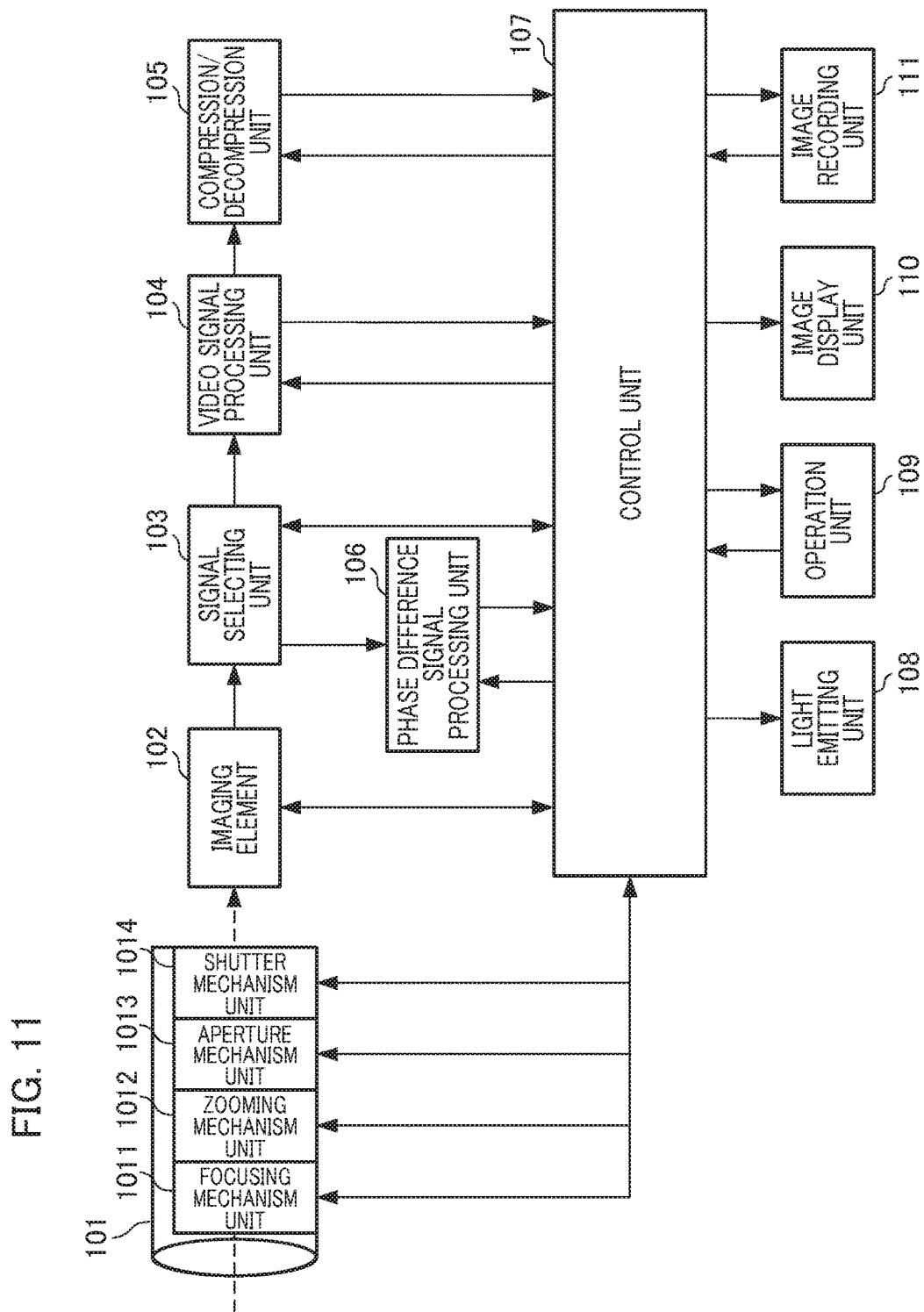
FIG. 11 is a block diagram illustrating a configuration of the imaging apparatus according to a second embodiment of the present invention.

An imaging apparatus shown in FIG. 11 includes a signal selecting unit 103 between the imaging element 102 and the video signal processing unit 104. The signal selecting unit 103 has a memory function and has a function that obtains imaging signals from the imaging element 102 under the control of the control unit 107, and allocates the signals to image signals for a video image process and phase difference pixel signals for a phase difference process.

Figure 12:
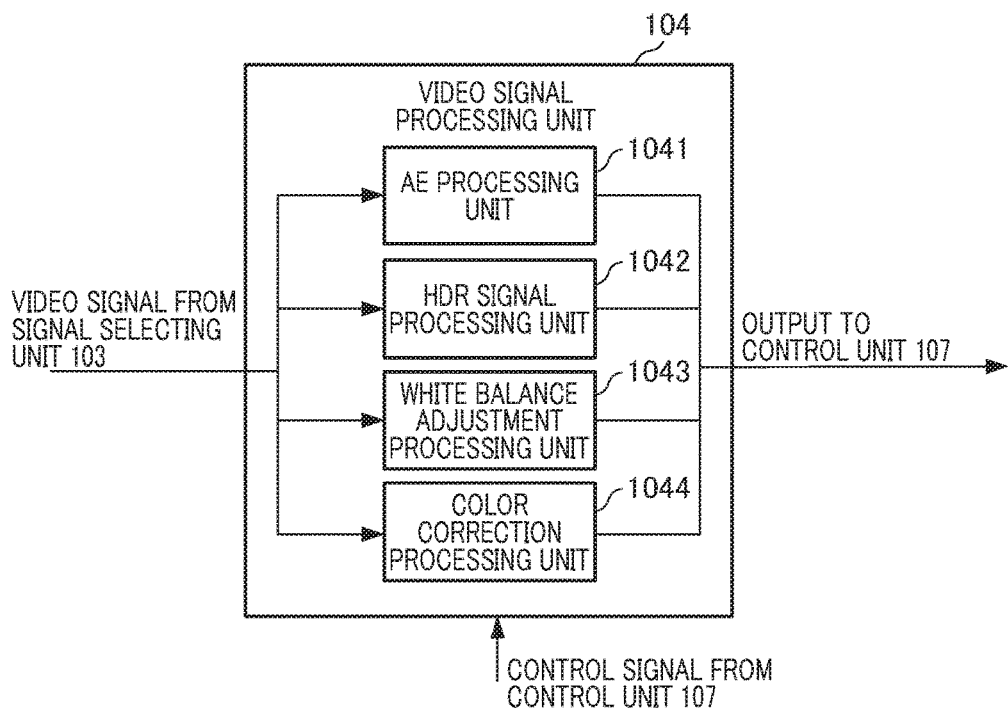
FIG. 12 is a block diagram illustrating a configuration of a video image signal processing unit of FIG. 11.

FIG. 12 is a block diagram illustrating a configuration example of the video signal processing unit 104. The video signal processing unit 104 includes the AE processing unit 1041, the HDR signal processing unit 1042, the white balance adjustment processing unit 1043, and the color correction processing unit 1044. The video signal processing unit 104 obtains signals for a video image process from the signal selecting unit 103, and performs the AE process, the HDR process, the white balance adjustment process, the color correction process, and the like.

The phase difference signal processing unit 106 obtains phase difference pixel signals from the signal selecting unit 103, performs the phase difference detecting process, and outputs the phase difference detection signals. The phase difference detection signals include phase difference information (defocus amount, focus position information). The phase difference detection signals output from the phase difference signal processing unit 106 are transmitted to the control unit 107. The control unit 107 calculates a defocus amount indicating a focus state of the imaging optical system based on the phase difference detection signals. The drive amount of the focus lens necessary for obtaining the focus state is calculated based on the calculated defocus amount, and the focus lens is moved to a target position by the focusing mechanism unit 1011, so that AF control operation is performed.

Figure 13:
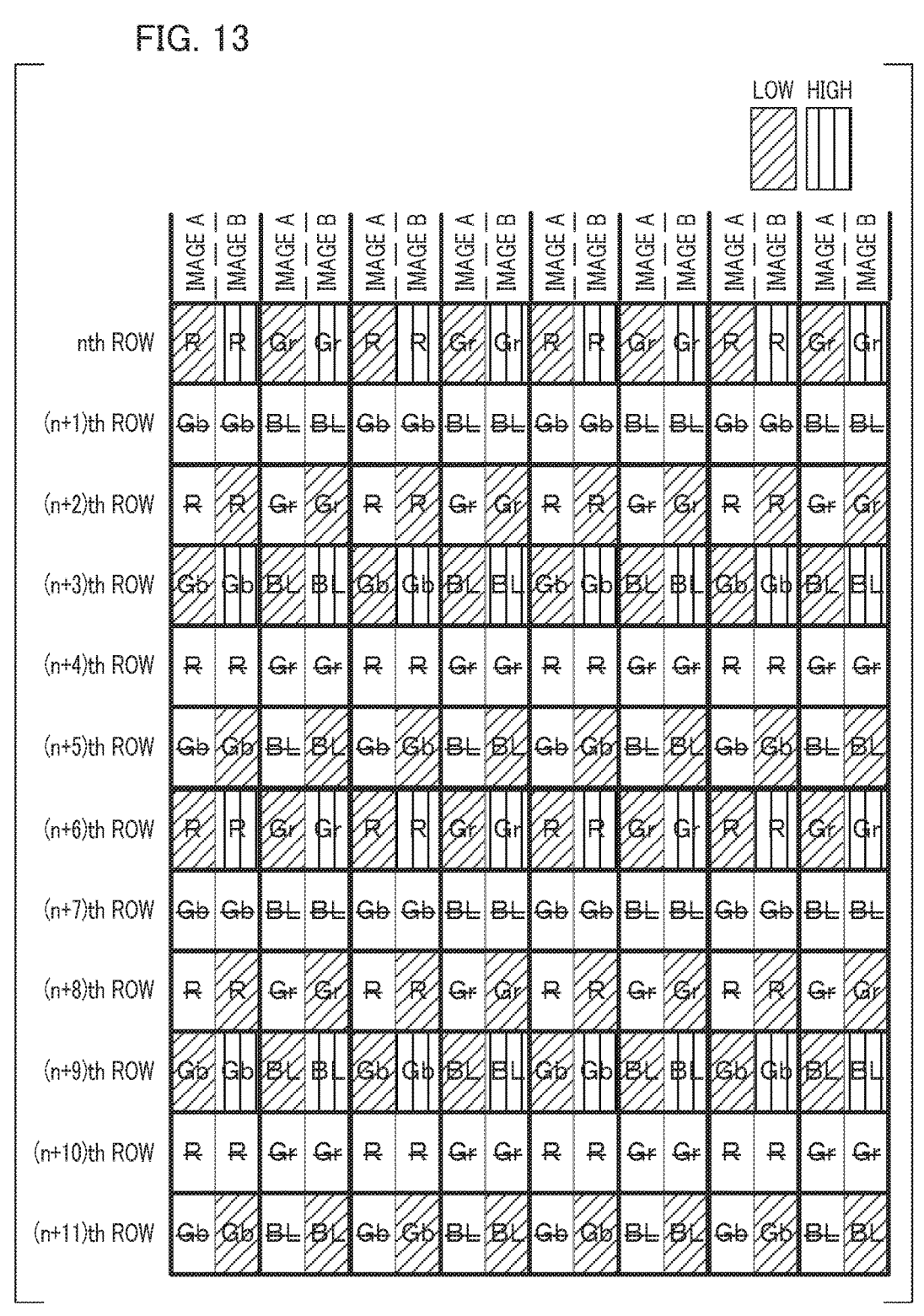

FIG. 13 is a schematic diagram illustrating the positions at which the pixel signals of the photoelectric conversion units 201L and 201R are read out with respect to the pixel arrangement shown in FIG. 4B. For the HDR process, shooting is performed such that an exposure difference between the image signal A and the image signal B is generated. In the present embodiment, as a signal readout for the phase difference detection, a process that reads out either the image signal A or the image signal B on a row separating from the HDR imaging row is performed. FIG. 13 illustrates each pixel unit from the n-th row to the (n+11)th row. The HDR imaging row is a row that enables obtaining pixel signals used for the HDR process, and is shown by each row of the n, the n+3, the n+6, and the n+9 in FIG. 13. Additionally, the readout rows of signals for the phase difference detection are shown by each row of the n+2, the n+5, the n+8, and the n+11 in FIG. 13. Hereinafter, a description will be given by serving a pixel imaged with an exposure time of long-second accumulation as a high exposure pixel and by serving a pixel imaged with an exposure time of short-second accumulation as a low exposure pixel. In FIG. 13, the photoelectric conversion units shown by obliquely hatched lines are defined as low exposure pixels and the photoelectric conversion units shown by vertical hatched lines are defined as high exposure pixels. Additionally, the photoelectric conversion units that do not read out the pixel signals are shown in a state of being outlined without hatching and a strikethrough is drawn for each characters of red (R), green (Gr, Gb), and blue (BL) in the Bayer arrangement.

The pixel units in the n-th row and the (n+6)th row in FIG. 13 are set to the exposure condition that is the same as the pixel units in the n-th row in FIG. 6, the image column A is set to the low exposure pixels, and the image column B is set to the high exposure pixels. Similarly, the pixel units in the (n+3)th row and the (n+9)th row in FIG. 13 are set to the exposure condition that is the same as the pixel units in the (n+3)th row in FIG. 6, and the image column A is set to the low exposure pixels, the image column B is set to the high exposure pixels. The (n+1)th row, the (n+4)th row, (the n+7)th row and the (n+10)th row in FIG. 13 are non-readout rows.

As described above, the HDR imaging rows are n-th row, the (n+3)th row, the (n+6)th row, and the (n+9)th row, and the imaging element is driven by thinning out two rows for video image signals. Note that, as another embodiment, the image signal A may be read out from the high exposure pixel and, the mage signal B may be read out from the low exposure pixel. Signals for the HDR process read out with an exposure difference between the image signal A and the image signal B are transmitted from the imaging element 102 to the HDR signal processing unit 1042 via the signal selecting unit 103, and the HDR process is then performed.

In contrast, the readout rows of the signals for the phase difference detection are located between the rows that are read in the HDR imaging row. In FIG. 13, pixel signals for the phase difference detection are read out in the (n+2)th row, the (n+5)th row, the (n+8)th row, and the (n+11)th row. In the present embodiment, a process that reads out only the image signal B is performed in the pixel units in these rows. For example, in the pixel units in the (n+2)th row, signals from the photoelectric conversion unit in the image column B corresponding to the R filter are read out, and signals from the photoelectric conversion unit in the image column B corresponding to the Gr filter are read out. In the pixel units in the (n+5)th row, a signal from the photoelectric conversion unit in the image column B corresponding to the Gb filter is read out, and a signal from the photoelectric conversion unit in the image column B corresponding to the BL filter is read out. At this time, the image signal B is set so as to have an exposure ratio identical to the image signal A in the HDR imaging row (same color row)that is two rows above and is read out. For example, the photoelectric conversion unit corresponding to the R filter of the image column A in the n-th row and the photoelectric conversion unit corresponding to the R filter of the image column B in the (n+2)th row are set so as to have the same signal output condition and are set as low exposure pixels. Similarly, the photoelectric conversion unit corresponding to the Gb filter of the image column A in the (n+3)th row and the photoelectric conversion unit corresponding to the Gb filter of the image column B in the (n+5)th row are set so as to have the same setting of the signal output conditions and are each set as low exposure pixels.

In FIG. 13, an example in which the output condition of the pixel signals for the photoelectric conversion unit in the image column B in the (n+2)th row is set to the same as that in the photoelectric conversion unit of the mage column A in the n-th row has been described. This is to prevent the saturation of the output level of the photoelectric conversion unit if the exposure value becomes excessive by setting the output condition to be matched with the photoelectric conversion unit in the column closer to the proper exposure. As a modified example of the signal readout, there is an example in which the phase difference detection is performed by obtaining the signals from the photoelectric conversion unit in the image column B in the n-th row and the photoelectric conversion unit in the image column A in the (n+2)th row. In this case, the photoelectric conversion unit in the image column B in the n-th row and the photoelectric conversion unit in the image column A in the (n+2)th row have the same setting as the output condition of the pixel signals. The same applies to the (n+3)th row and the (n+5)th row, the (n+6)th row and the (n+8)th row, the (n+9)th row, and the (n+11)th row. It is possible to appropriately change the signal readout method depending on the shooting state, the AE value, and the like.

Additionally, as another modification, there is an example of performing the phase difference detection using signals calculated based on the signals obtained from the photoelectric conversion units of the pixel units in different rows. It is assumed that the output conditions of the photoelectric conversion units of the pixel units in the n-th row and the (n+2)th row are set to 1R for the image column A and are set to 2R for the image column B. 1R and 2R correspond to the exposure ratio, and the exposure ratio of each photoelectric conversion unit in the image column A and the image column B is 1:2 as denoted by the numbers.

|  | Image A | Image B |
| --- | --- | --- |
| n-th row | 1R | 2R |
| (n + 2)th row | 1R | (not read out) |

The 1R signal is read out from the photoelectric conversion unit in the image column A in the n-th row and the (n+2)th row, the 2R signal obtained by adding the 1R signals and the 2R signal from the photoelectric conversion unit in the image column B in the n-th row are read out, and then the phase difference detection is performed by using the signals of the same output level. As described above, it is possible to use signals calculated by combining a plurality of signals obtained from the photoelectric conversion units included in each pixel unit in different rows. Calculations include addition, subtraction, average value calculation, weighting calculation, and the like.

The control unit 107 determines the pixel unit in the readout row of the phase difference pixel signals and the exposure condition based on the calculated result of the AE process of the previous frame calculated by the AE processing unit 1041. The control unit 107 determines a proper exposure condition if performing the phase difference detection in the current frame, and consequently determines the readout row, the selection of the photoelectric conversion unit to be used, and the exposure condition. Based on the determined exposure condition, an operation that reads out the image signal A or the image signal B in the readout row of the phase difference pixel signals is performed. In the present embodiment, the image signal B is obtained in the readout row of the phase difference pixel signal. The exposure condition of the pixel unit is set in the HDR imaging row, and a signal process of the image A and the image B is performed. The exposure ratio between the photoelectric conversion unit in the image column A and the photoelectric conversion unit in the image column B is set to a predetermined value. At that time, a photoelectric conversion unit in the readout row of the phase difference pixel signals and a photoelectric conversion unit at a position where an exposure state becomes an opposite phase relation with respect to the photoelectric conversion unit have the same setting values of the exposure condition. In the present embodiment, the image column A in the HDR imaging row and the image B column in the readout row of the phase difference pixel signal have the same setting as the exposure condition of the pair of photoelectric conversion units.

The phase difference signal processing unit 106 performs the phase difference detection process from the image signal A in the HDR imaging row and the image signal B in the readout row of the phase difference pixel signal and generates phase difference detection signals. Accordingly, the signal selecting unit 103 selects the image signal A of the HDR imaging row and the image signal B of the readout row of the phase difference pixel signals, and transmits the signals to the phase difference signal processing unit 106. Signals for one frame are output from the imaging element 102 by sequentially reading out the pixel signals from each row from the top to the bottom with respect to the pixel unit 201. The signal selecting unit 103 allocates the signals to pixel signals for the HDR process and the phase difference pixel signals for the phase difference detection and simultaneously output to each of the video signal processing unit 104 and the phase difference signal processing unit 106.

As described above, in the readout row of the phase difference pixel signals, the exposure condition suitable for the phase difference detection is determined by using the information by the AE processing unit 1041 in the video signal processing unit 104. Hence, it is possible to easily avoid highlight-detail loss of the signals and an exposure condition with a low S/N ratio (signal-to-noise ratio). Additionally, the column signal processing circuits 204 in the pixel column not to be read out can be set to a standby state by reading only the signals of the image A or the image B. Specifically, the circuit unit is enabled to sleep, and operating the vertical drive circuit 203 and the horizontal drive circuit 205 is not necessary, so that a power saving effect can be obtained. Therefore, according to the present embodiment, both the HDR process and the phase difference detection are made compatible and contribute to power saving.

Figure 14:
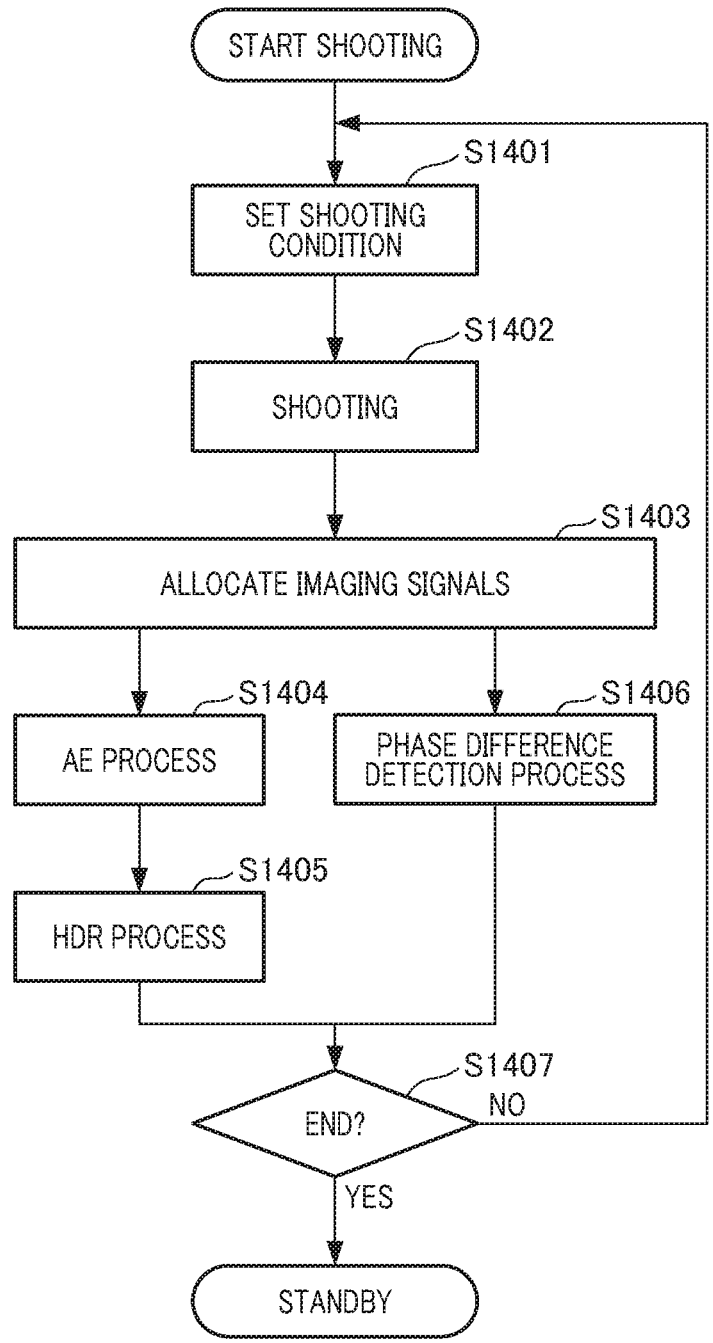
FIG. 14 is a flowchart illustrating a process example according to the second embodiment.

The process in the present embodiment will be described with reference to a flowchart of FIG. 14. If the shooting starts, a predetermined shooting condition is set by the control unit 107 in step S1401. Next, in step S1402, the imaging element 102 is driven under the control of the control unit 107 in accordance with the shooting condition set in step S1401. The shooting operation that makes both the HDR process and the phase difference detection compatible is performed. In step S1403, the signal selecting unit 103 allocates the pixel signals after the shooting obtained in step S1402 to the pixel signals for the video image process and the phase difference pixel signals. The separated pixel signals for the video image process are processed by the video signal processing unit 104 in step S1404. Additionally, the separated phase difference pixel signals are processed by the phase difference signal processing unit 106 in step S1406. The HDR signal process and the phase difference detection process are simultaneously performed from the image signals for one frame obtained a single shooting. That is, the processes shown in S1404 and S1405 and the process shown in S1406 are executed as parallel processes.

In step S1404, the AE processing unit 1041 calculates the AE value based on the pixel signals allocated in step S1403. In step S1405, the HDR signal processing unit 1042 executes the HDR process. In contrast, in step S1406, the phase difference signal processing unit 106 performs the phase difference detection using the phase difference pixel signals that have been allocated in step S1403.

After the processes of steps S1405 and S1406 end, the process proceeds to S1407. The control unit 107 determines whether or not shooting will end. If the control unit 107 determines that the shooting will end, the process proceeds to a standby state. In contrast, if the control unit 107 determines that the shooting will be continued, the process returns to step S1401. The shooting condition is reset based on the AE value obtained in step S1404 and the shooting is continued. The HDR process and the phase difference detection process are simultaneously compatible in a single shooting by the operation of the present embodiment.

(Modification)

Figure 15:
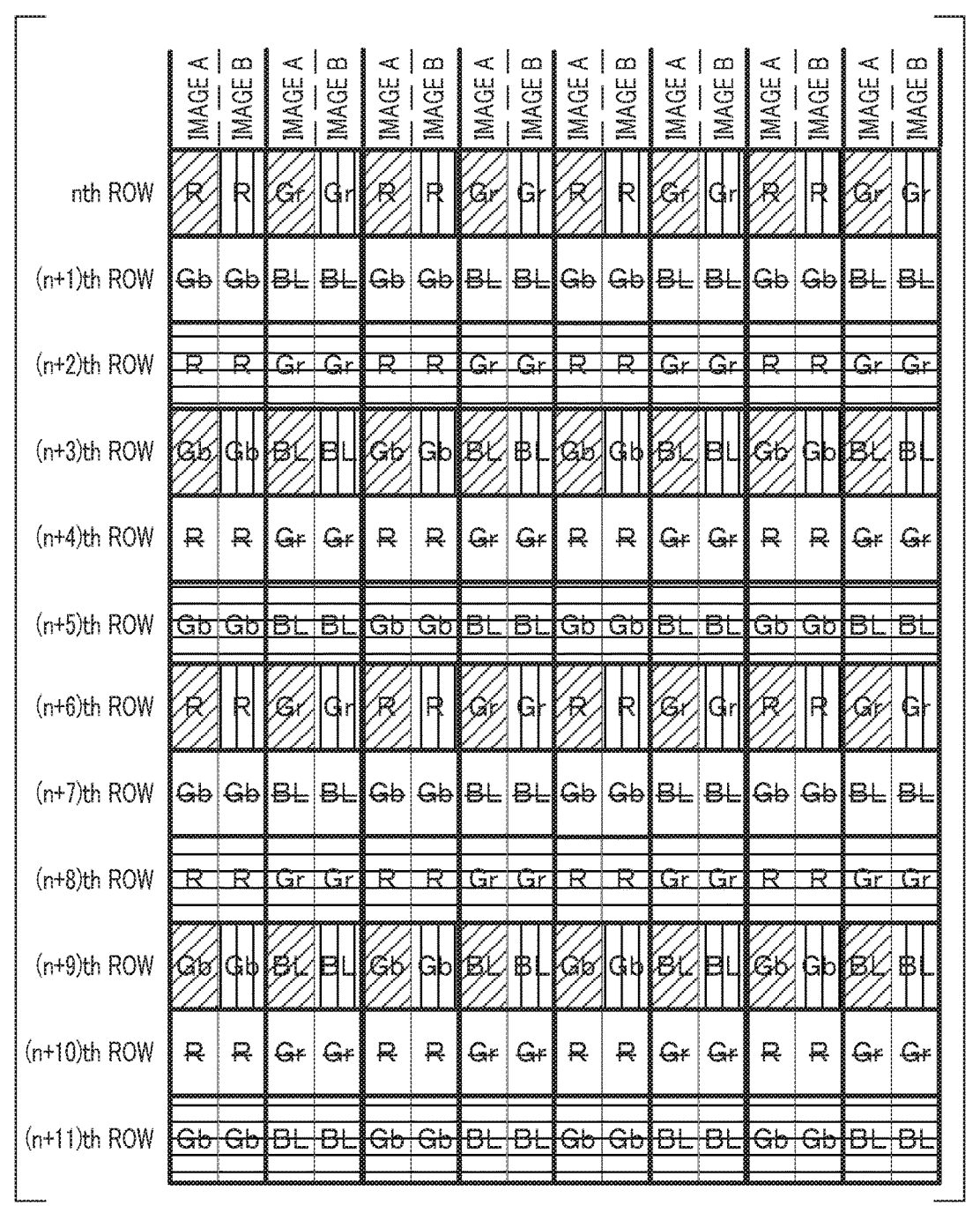

With reference to FIG. 15, an imaging apparatus according to a modification of the second embodiment will be described. FIG. 15 is a schematic diagram illustrating the positions at which the pixel signals of the photoelectric conversion units 201L and 201R are readout in the modification. In FIG. 15, the differences between the exposure states of the photoelectric conversion units 201L and 201R are represented by each of oblique lines, vertical lines, and horizontally hatched lines.

The feature of the modification is that the image signal A and the image signal B are both read out in the readout rows of the phase difference pixel signals. For example, in FIG. 15, the readout rows of the phase difference pixel signals are the (n+2)th row, the (n+5)th row, the (n+8)th row, and the (n+11)th row. In these rows, the exposure conditions are set to the same as those between the photoelectric conversion units in the image column A and the photoelectric conversion units in the image column B. Note that the HDR imaging rows are the same as those in FIG. 13. That is, in the HDR imaging rows, low exposure pixels and high exposure pixels are read out in the same row. In the readout rows of the phase difference pixel signals, the pixel signals are read out in the same row with the identical exposure setting for both the image A and the image B.

In the present modification, the readout step in the vertical direction between the image A and the image B is eliminated by reading out the image signal A and the image signal B for the phase difference detection in the identical row. Accordingly, in the shooting of an oblique-shaped object and the like, it is possible to prevent the occurrence of a phase difference detection error between the image A and the image B or to reduce the error.

In FIG. 15, in the readout row of the phase difference pixel signals, the exposure setting suitable for the phase difference detection process is performed based on the AE value calculated by the AE processing unit 1041. In this case, an exposure setting value different from the setting value used in the HDR imaging row is used. In FIG. 15, this is represented by the horizontally hatched lines given to each photoelectric conversion units in the image A column and the image B column.

In the present modification, in the readout row of the phase difference pixel signal, signals are read out in the identical row in both the image A and the image B, and the exposure condition that is different from that in the HDR imaging row is set. Therefore, it is possible to obtain phase difference pixel signals suitable for the phase difference signal process with an improvement of the phase difference detection accuracy while obtaining HDR imaging signals.

In the embodiment having four photoelectric conversion units in which each pixel unit is divided into two in the horizontal and vertical directions, the output conditions of the pixel signals can be set differently for each photoelectric conversion unit. For example, in one pixel unit, the output condition "1R" is set in the first photoelectric conversion unit in the image column and the fourth photoelectric conversion unit in the image B column, and the output condition "2R" is set in the third photoelectric conversion unit in the image A column and the second photoelectric conversion unit in the image B column.

| Image A | Image B |
|---------|---------|
| (1) 1R  | (2) 2R  |
| (3) 2R  | (4) 1R  |

(1) to (4) respectively represent the first to fourth photoelectric conversion units in one pixel unit. The phase difference detection is enabled based on the signals of 1R or the signals of 2R.

According to the first and second embodiments, in the imaging element in which a plurality of photoelectric conversion units correspond to each microlens and the imaging apparatus using the imaging element, a plurality of signal processes can be executed based on the frame image obtained by a single shooting. In other words, it is possible to simultaneously execute the generation process of the image signals with a wide dynamic range and the focus detecting process. Note that, in the first and second embodiments, the configuration example in which the video signal processing unit 104 and the phase difference signal processing unit 106 are provided in the imaging apparatus with respect to the imaging element 102 has been described. However, a configuration in which at least a part of these functions of the signal processing unit may be provided in the imaging element. In this case, for example, in the imaging element, a pixel array section (imaging section) in which a large number of pixel units are arranged in a matrix of rows and columns and a signal processing unit that processes the signals of each pixel unit are mounted on an integrated circuit chip. For example, in the case of a stacked imaging element, the imaging element has a configuration in which a second integrated circuit chip configuring the imaging section is stacked on a first integrated circuit chip configuring the signal processing unit. At this time, for the focus detection, a correlation calculation unit that performs correlation calculation of two images and a calculation unit that calculates an image deviation amount based on the correlation calculation result may be provided to serve as the signal processing unit configured on the first integrated circuit chip. Accordingly, an amount of image deviation (or a defocus amount) or its distribution may be output as the output from the imaging element 102, so that it is possible to lower the manufacturing cost of the sensor and to secure the bandwidth of an image processing unit. Additionally, at this time, for the HDR process, a correction processing unit that corrects pixel defects and signal variations due to the imaging element 102 and the like and a synthesis processing unit that performs HDR synthesis may be provided. Accordingly, since the image signals for one frame after synthesis are output as the output from the imaging element 102, in addition to the effect similar to that described above, an important process that determines the image quality may be charged to the image processing unit that may allow analysis and process with higher accuracy. The present invention is not limited to this, and for the focus detection and the HDR process, some or all of other processes may be provided in the signal processing unit in the imaging element 102. Additionally, as a specific configuration example of the signal processing unit, one signal processing unit that performs a first signal process that performs a bit range expanding process in the HDR process and a second signal process that performs the phase difference detection in parallel may be provided.

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment (s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-110500, filed Jun. 1, 2016, which is hereby incorporated by reference wherein in its entirety.

What is claimed is:

1. An imaging element that enables obtaining signals from a plurality of pixel units and performing a plurality of signal processes, comprising:
   one or more processors; and
   a memory storing instructions which, when the instructions are executed by the one or more processors, cause the image capturing apparatus to function as:
      a setting unit configured to set an output condition of pixel signals with respect to first and second photoelectric conversion units included in each of the pixel units, wherein different exposure conditions are set between the first and second photoelectric conversion units;
      a signal processing unit configured to execute a first signal process that generates image signals from the signals of the first and second photoelectric conversion units for displaying and a second signal process that generates a pair of signals using the signals of the first and second photoelectric conversion units based on a difference between the exposure conditions of the first and second photoelectric conversion units for performing focus detection using the generated pair of signals.

2. The imaging element according to claim 1, wherein the setting unit sets one or more of an exposure time, an amplification degree, and a sensitivity of the signals to a value that is different from that of the first and second photoelectric conversion units.

3. The imaging element according to claim 1, wherein, in the first signal process, the signal processing unit performs a dynamic range expanding process of the image signal.

4. The imaging element according to claim 1, wherein, in the second signal process, the signal processing unit performs a signal process of phase difference detection as the focus detection.

5. The imaging element according, to claim 1, wherein, in the second signal process, the signal processing unit corrects an exposure difference between signal of the first photoelectric conversion unit and the signal of the second photoelectric conversion unit based on the difference between the exposure conditions of the first and second photoelectric conversion units, and performs a signal process using the corrected signals.

6. The imaging element according to claim 1, wherein the first and second signal processes are executed in parallel.

7. The imaging element according to claim 1, wherein the signal processing unit performs the focus detection.

8. The imaging element according to claim 1, wherein the imaging element is stacked imaging element that has a configuration in which a second integrated circuit chip configuring the imaging section is stacked on a first integrated circuit chip configuring the signal processing unit.

9. An imaging apparatus including an imaging element having a plurality of pixel units and performing a plurality of signal processes by obtaining signals from the pixel unit, comprising:
   one or more processors; and
   a memory storing instructions which, when the instructions are executed by the one or more processors, cause the image capturing, apparatus to function as:
      a setting unit configured to set an output condition for pixel signals with respect to first and second photoelectric conversion units included in each of the pixel units, wherein different exposure conditions are set between the first and second photoelectric conversion units; and
      a signal processing unit configured to execute a first signal process that generates image signals from the signals of the first and second photoelectric conversion units for displaying, and a second signal process that generates a pair of signals using the signals of the first and second photoelectric conversion units based on a difference between the exposure conditions of the first and second photoelectric conversion units and performs focus detection using the generated pair of signals.

10. A method for processing imaging signals that obtains signals from a plurality of pixel units and performs a plurality of signal processes by a signal processing unit, the method comprising:
   setting, by a setting unit, an output condition for pixel signals with respect to the first and second photoelectric conversion units included in each of the pixel units, wherein different exposure conditions are set between the first and second photoelectric conversion units; and
   performing, by the signal processing unit, a first signal process that generates image signals from the signals of the first and second photoelectric conversion units for displaying, and a second signal process that generates a pair of signals using the signals of the first and second photoelectric conversion units based on a difference between the exposure conditions of the first and second photoelectric conversion units for performing focus detection using the generated pair of signals.

11. The method according to claim 10, wherein the signal processing unit performs the focus detection.

12. The method according to claim 10, wherein the imaging element is stacked imaging element that has a configuration in which a second integrated circuit chip configuring the imaging section is stacked on a first integrated circuit chip configuring the signal processing unit.

13. An imaging element that enables obtaining signals from a plurality of pixel units and performing a plurality of signal processes, comprising:
   one or more processors; and
   a memory storing instructions which, when the instructions are executed by the one or more processors, cause the image capturing apparatus to function as:
      a setting unit configured to set an output condition of pixel signals with respect to first and second photoelectric conversion units included in each of the pixel units, wherein different exposure conditions are set between the first and second photoelectric conversion units;
      a signal processing unit configured to execute a first signal process that generates image signals from the signals of the first and second photoelectric conversion units for displaying and a second signal process that generates a pair of signals using the signals of the first and second photoelectric conversion units based on a difference between the exposure conditions of the first and second photoelectric conversion units for performing focus detection, wherein, in the second signal process, the signal processing unit generates one of the pair of image signals using the signal of the first photoelectric conversion unit, and generates other of the pair of image signals using the signal of the second photoelectric conversion unit having the exposure difference from the signal of the first photoelectric conversion unit.

14. The imaging element according to claim 13, wherein the signal processing unit performs the focus detection.

15. The imaging element according to claim 13, wherein the imaging element is stacked imaging element that has a configuration in which a second integrated circuit chip configuring the imaging section is stacked on a first integrated circuit chip configuring the signal processing unit.

* * * * *